(12) United States Patent
Hoshuyama et al.

(10) Patent No.: US 9,626,151 B2
(45) Date of Patent: Apr. 18, 2017

(54) INFORMATION PROCESSING DEVICE, PORTABLE DEVICE AND INFORMATION PROCESSING SYSTEM

(71) Applicant: NIKON CORPORATION, Tokyo (JP)

(72) Inventors: Hideo Hoshuyama, Kawasaki (JP); Hiroyuki Akiya, Tokyo (JP); Kazuya Umeyama, Tokyo (JP); Keiichi Nitta, Kawasaki (JP); Hiroki Uwai, Yokohama (JP); Masakazu Sekiguchi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/612,776

(22) Filed: Feb. 3, 2015

(65) Prior Publication Data

US 2015/0145770 A1    May 28, 2015

Related U.S. Application Data

(62) Division of application No. 13/575,612, filed as application No. PCT/JP2011/052446 on Feb. 4, 2011, now Pat. No. 9,013,399.

(30) Foreign Application Priority Data

Feb. 18, 2010   (JP) .................................. 2010-033982
Feb. 18, 2010   (JP) .................................. 2010-033985
(Continued)

(51) Int. Cl.
    *G06F 3/16*       (2006.01)
    *G06F 21/32*      (2013.01)
    (Continued)

(52) U.S. Cl.
    CPC .............. *G06F 3/167* (2013.01); *G06F 21/32* (2013.01); *G06F 21/6218* (2013.01);
    (Continued)

(58) Field of Classification Search
    CPC ...... G06F 3/167; G06F 21/32; G06F 21/6218; G06F 21/6254
    (Continued)

(56) References Cited

U.S. PATENT DOCUMENTS 5,442,780 A   8/1995   Takanashi et al.
6,711,474 B1  3/2004   Treyz et al.
(Continued)

FOREIGN PATENT DOCUMENTS

CN       1859086 A       11/2006
JP     H04-348470 A      12/1992
(Continued)

OTHER PUBLICATIONS

International Search Report issued in Internation Patent Application No. PCT/JP2011/052446 dated May 10, 2011.
(Continued)

*Primary Examiner* — Fred Tzeng
(74) *Attorney, Agent, or Firm* — Oliff PLC

(57) ABSTRACT

To take security into account and increase user friendliness, an information processing device includes: an input unit to which information is input; an extracting unit extracting predetermined words from the information input to the input unit; a classifying unit classifying the words extracted by the extracting unit into first words and second words; and a converting unit converting the first words by a first conversion method and converting the second words by a second conversion method, the second conversion method being different from the first conversion method.

14 Claims, 25 Drawing Sheets

(30) Foreign Application Priority Data

| Feb. 18, 2010 | (JP) | 2010-033988 |
| Feb. 18, 2010 | (JP) | 2010-033997 |
| Feb. 18, 2010 | (JP) | 2010-034003 |
| Feb. 18, 2010 | (JP) | 2010-034013 |

(51) Int. Cl.
*G06F 21/62* (2013.01)
*G10L 15/26* (2006.01)
*G10L 15/30* (2013.01)

(52) U.S. Cl.
CPC .. *G06F 21/6254* (2013.01); *G06F 2221/2111* (2013.01); *G06F 2221/2113* (2013.01); *G06F 2221/2149* (2013.01); *G10L 15/26* (2013.01); *G10L 15/30* (2013.01)

(58) Field of Classification Search
USPC ........................................................ 345/156
See application file for complete search history.

(56) References Cited

U.S. PATENT DOCUMENTS

| 7,113,169 | B2 | 9/2006 | Gnanamgari et al. |
| 7,446,799 | B2 | 11/2008 | Suzuki |
| 7,787,697 | B2 | 8/2010 | Ritzau et al. |
| 8,059,790 | B1 | 11/2011 | Paterik et al. |
| 8,165,409 | B2 | 4/2012 | Ritzau et al. |
| 8,179,822 | B2 * | 5/2012 | Shiina ................ H04M 3/4938 370/261 |
| 8,195,468 | B2 | 6/2012 | Weider et al. |
| 8,515,173 | B2 | 8/2013 | Shudo |
| 8,553,854 | B1 | 10/2013 | Weaver et al. |
| 8,595,007 | B2 | 11/2013 | Kane |
| 2004/0225419 | A1 | 11/2004 | Sakai et al. |
| 2005/0088297 | A1 | 4/2005 | Miyajima |
| 2005/0182627 | A1 | 8/2005 | Tanaka et al. |
| 2007/0005570 | A1 | 1/2007 | Hurst-Hiller et al. |
| 2010/0179813 | A1 | 7/2010 | Summerfield et al. |
| 2011/0286585 | A1 | 11/2011 | Hodge |
| 2012/0022872 | A1 | 1/2012 | Gruber et al. |
| 2012/0249328 | A1 | 10/2012 | Xiong |
| 2013/0117022 | A1 | 5/2013 | Chen et al. |

FOREIGN PATENT DOCUMENTS

| JP | 5-234338 A | 9/1993 |
| JP | 7-222248 A | 8/1995 |
| JP | 10-134047 A | 5/1998 |
| JP | 11-31000 | 2/1999 |
| JP | 2001-318915 A | 11/2001 |
| JP | 2002057811 A | 2/2002 |
| JP | 2002-259363 A | 9/2002 |
| JP | 2003-256287 A | 9/2003 |
| JP | 2003-288356 A | 10/2003 |
| JP | 2003316803 A | 11/2003 |
| JP | 2004-086441 A | 3/2004 |
| JP | 2004129168 A | 4/2004 |
| JP | 2004-287201 A | 10/2004 |
| JP | 2004-330891 A | 11/2004 |
| JP | 2005-110869 A | 4/2005 |
| JP | 2005-270543 A | 10/2005 |
| JP | 2005283843 A | 10/2005 |
| JP | 2006-039681 A | 2/2006 |
| JP | 2006039294 A | 2/2006 |
| JP | 2006107044 A | 4/2006 |
| JP | 2006-155283 A | 6/2006 |
| JP | 2006-185311 A | 7/2006 |
| JP | 2006-211573 A | 8/2006 |
| JP | 2006-308848 A | 11/2006 |
| JP | 2006-309356 A | 11/2006 |
| JP | 2006-330577 A | 12/2006 |
| JP | 2007-080046 A | 3/2007 |
| JP | 2007-233075 A | 9/2007 |
| JP | 2007-292814 A | 11/2007 |
| JP | 2008-015018 A | 1/2008 |
| JP | 2008-123447 A | 5/2008 |
| JP | 2008154125 A | 7/2008 |
| JP | 2009-500720 A | 1/2009 |
| JP | 2009-055108 A | 3/2009 |
| JP | 2009-093420 A | 4/2009 |
| JP | 2009-104237 A | 5/2009 |
| JP | 2009-145973 A | 7/2009 |
| JP | 2009-152773 A | 7/2009 |
| JP | 2009-237625 A | 10/2009 |
| JP | 2010-005326 A | 1/2010 |
| JP | 2011170635 A | 9/2011 |

OTHER PUBLICATIONS

Jun. 12, 2012 Office Action issued in Japanes Application No. 2010-034003.
Oct. 2, 2012 Office Action issued in Japanese Patent Application No. 2010-034003.
Office Action issued in Japanese Patent Application No. 2010-034003 dated Apr. 16, 2013.
Office Action issued in Japanese Patent Application No. 2010-034013 dated May 21, 2013.
Office Action issued in Japanese Patent Application No. 2010-033982 dated May 28, 2013.
Office Action issued in Japanese Patent Application No. 2010034013 dated Jul. 30, 2013.
Office Action issued in Japanese Patent Application No. 2010-033985 dated Sep. 3, 2013.
Nov. 26, 2013 Office Action issued in Japanese Patent Application No. 2010-033997.
Feb. 4, 2014 Office Action issued in Japanese Patent Application No. 2010-033985.
Office Action issued in Japanese Patent Application No. 2010-033988 dated Apr. 1, 2014.
Office Action issued in Japanese Patent Application No. 2010-034013 dated Apr. 8, 2014.
Office Action issued in Japanese Patent Application No. 2010-033985 issued Apr. 22, 2014.
Sep. 16, 2015 Office Action issued in Chinese Patent Application No. 201180010169.X.
Jun. 16, 2015 Office Action issued in Japanese Patent Application No. 2010-34013.
Jun. 9, 2015 Appeal issued in Japanese Patent Application No. 2010-33985.
Dec. 8, 2015 Office Action issued in Japanese Patent Application No. 2010-033988.
Dec. 15, 2015 Office Action issued in Japanese Patent Application No. 2015-086284.
Jan. 7, 2015 Office Action issued in Chinese Patent Application No. 201180010169.X.
Feb. 3, 2015 Office Action issued in Japanese Patent Application No. 2010-033988.
Jul. 26, 2016 Decision of Refusal issued in Japanese Patent Application No. 2015-086284.
Oct. 11, 2016 Office Action issued in Japanese Patent Application No. 2016-044930.
Feb. 7, 2017 Office Action issued in Japanese Patent Application No. 2016-044930.

* cited by examiner

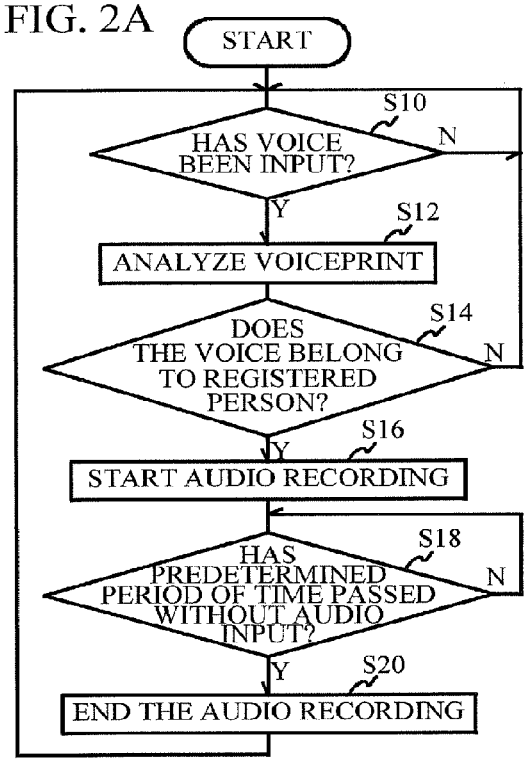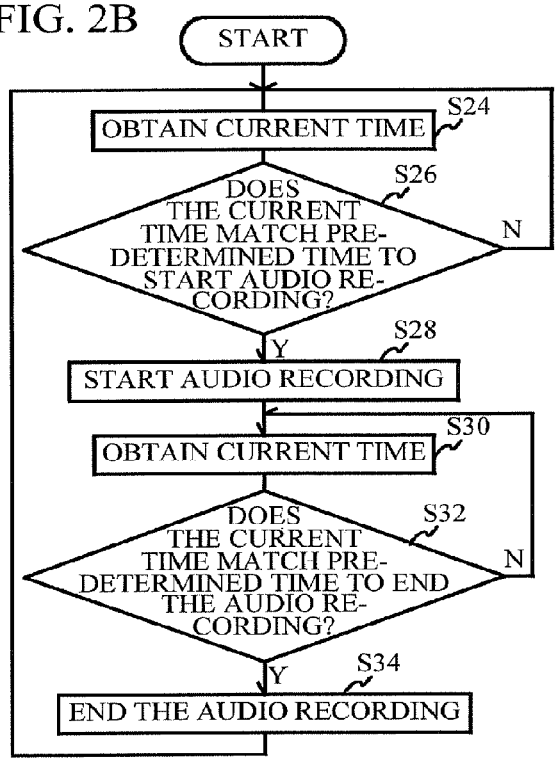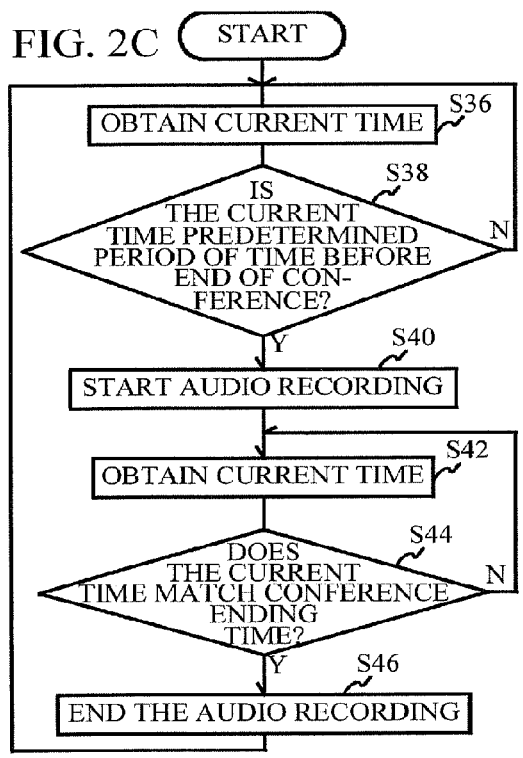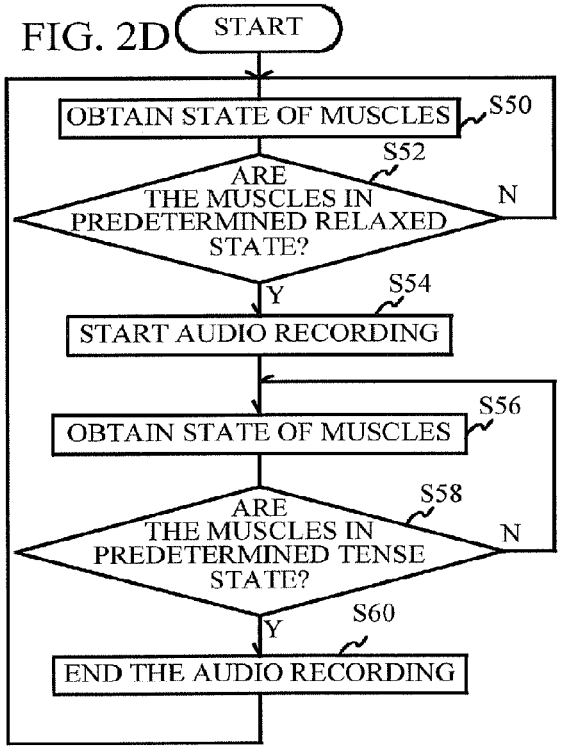

FIG. 3

<VOICEPRINT DATA DB>

| INDIVIDUAL NAME | VOICEPRINT DATA |
|---|---|
| ICHIRO AOYAMA | (VOICEPRINT DATA 1) |
| JIRO ITO | (VOICEPRINT DATA 2) |
| ... | ... |
| MITSUO UEDA | (VOICEPRINT DATA m) |
| YONJYURO ENDO | (VOICEPRINT DATA n) |
| ... | ... |
| GORO OKADA | (VOICEPRINT DATA p) |
| ... | ... |

FIG. 5

<STORAGE DATA DB>

| RELEVANT INFORMATION | DEGREE OF ASSOCIATION |
|---|---|
| TIME | 2010/01/18 11:23.16 |
| LOCATION | NORTH LATITUDE: X DEGREES, X MINUTES, X SECONDS<br>EAST LONGITUDE: X DEGREES, X MINUTES, X SECONDS |
| TEXT DATA | FINISH THIS REPORT BY TOMORROW |
| PERSON WHO HAS EMITTED VOICE | ICHIRO TANAKA |
| AUDIO VOLUME LEVEL | 80db |
| TASK FLAG | ON |
| TASK PRIORITY | 9 |

FIG. 7

<KEYWORD DB>

| KEYWORD | INFORMATION | ATTRIBUTE | CONFIDEN-TIALITY |
|---|---|---|---|
| ICHIRO AOYAMA | DAI-TOKYO KABUSHIKI KAISHA; CAMERA, AF MOTOR; TOKKYO WORK-SHOP (TOKYO), OCTOBER 15, 2009 | NAME OF INDIVIDUAL OF CLIENT COMPANY | HIGH |
| JIRO ITO | NEW WORLD KABUSHIKI KAISHA; SALES; COPIER DISTRIBUTION | | |
| ... | ... | | |
| SABURO UEDA | DEVELOPMENT DEPARTMENT; CAMERA, SENSOR | NAME OF INDIVIDUAL IN COMPANY | MEDIUM |
| YONJYURO ENDO | ACCOUNTING DEPARTMENT; GM | | |
| ... | ... | | |
| GORO OKADA | JAPAN FIRST TRADING, K.K.; CEO | NAME OF OTHER INDIVIDUAL | LOW |
| ROKUZO KANEKO | ENTERTAINER | | |
| ... | ... | | |
| DAI-TOKYO KABUSHIKI KAISHA | ELECTRONICS; SHINAGAWA-WARD, TOKYO | NAME OF CLIENT COMPANY | HIGH |
| NEW WORLD KABUSHIKI KAISHA | FINANCE; UBE CITY, YAMAGUCHI PREFECTURE | | |
| ... | ... | | |
| N SALES AGENCY | DISTRIBUTION; SAITAMA CITY, SAITAMA PREFECTURE | SUBSIDIARY | MEDIUM |
| ... | ... | | |
| SVS COMPANY | MACHINERY; MUNICH, GERMANY | NAME OF OTHER COMPANY | LOW |
| JAPAN FIRST TRADING, K. K. | TRADING; OSAKA CITY, OSAKA | | |
| ... | ... | | |
| SOFTWARE SoftWare | <SPONGE> | TECHNICAL TERM | MEDIUM |
| ENCODER EnCoder | <WHIRLING> | | |
| SPECIFICATION SPecification | | | |
| ... | ... | | |
| COOlBLUE-SPEAKER 2 CoolBlueSpeaker2 | | PRODUCT NAME | MEDIUM |
| NEW MODEL 55 NewModel55 | | | |
| ... | | | |
| SHINAGAWA-WARD, TOKYO | | PLACE NAME | LOW OR COM-PLIANT WITH ACCOMPANY-ING KEYWORD |
| ... | | | |

FIG. 11

<SPECIFIC CONVERSION WORD DB>

| | BEFORE CONVERSION | AFTER CONVERSION |
|---|---|---|
| COMPANY NAME | KABUSHIKI KAISHA | SHA |
| | PRIVATE LIMITED COMPANY | |
| | SHA | |
| | K. K. | |
| | Co., Ltd. | |
| | ... | |
| COUNTRY AND THE LIKE | INSTITUTION | ORGANI-ZATION |
| | MINISTRY | |
| | AGENCY | |
| | ... | |
| EDUCATIONAL ESTABLISHMENT | UNIVERSITY | SCHOOL |
| | HIGH SCHOOL | |
| | TECHNICAL COLLEGE | |
| | JUNIOR HIGH SCHOOL | |
| | ... | |
| ... | ... | ... |

FIG. 13

<PLACE NAME DB>

| PLACE NAME | CONFIDENTIALITY : HIGH | CONFIDENTIALITY : MEDIUM |
|---|---|---|
| SHINAGAWA WARD, TOKYO | SOUTH REGION, KANTO | SOUTH EAST REGION, TOKYO |
| ... | ... | ... |
| SHIMONOSEKI CITY, YAMAGUCHI PREFECTURE | WEST REGION, CHUGOKU AREA | WEST REGION, YAMAGUCHI PREFECTURE |
| ... | ... | ... |
| MUNICH, GERMANY | CENTRAL EUROPE | SOUTH REGION, GERMANY |
| ... | ... | ... |

FIG. 14

<KEYWORD STORAGE DB>

| REGION O | REGION A | REGION B | REGION C |
|---|---|---|---|
| ICHIRO AOYAMA | L.A.; CAMERA, AFM; T WORKSHOP (TOKYO), OCTOBER 15, 2009 | — | — |
| SABURO UEDA | — | S. UEDA; M OF DEVELOPMENT DEPARTMENT ; CAMERA, SENSOR | — |
| GORO OKADA | — | — | GORO OKADA |
| DAI-TOKYO KABUSHIKI KAISHA | D-SHA; ELECTRONICS; SOUTH KANTO | — | — |
| SVS COMPANY | — | — | SVS COMPANY; MACHINERY; MUNICH, GERMANY |
| SOFTWARE | — | SW/SPONGE | — |
| ENCODER | — | EC/WHIRLING | — |
| SPECIFICATION | — | SP | — |
| COOL BLUE SPEAKER 2 | — | CBS2 | — |

FIG. 15A

<ATTRIBUTE-RELATED WEIGHT TABLE>

| POSITION | WEIGHT (Tw) |
|---|---|
| LEADER AND BELOW LEADER | 1 |
| M | 2 |
| GM AND ABOVE GM | 3 |

FIG. 15B

<VOLUME-LEVEL-RELATED WEIGHT TABLE>

| AUDIO VOLUME LEVEL | WEIGHT (Vw) |
|---|---|
| LOWER THAN 60 db | 1 |
| NOT LOWER THAN 60 db BUT LOWER THAN 70 db | 2 |
| NOT LOWER THAN 70 db | 3 |

FIG. 15C

<KEYWORD-RELATED WEIGHT TABLE>

| KEYWORD | WEIGHT (Kw) |
|---|---|
| IMPORTANT/ SIGNIFICANT | 2 |
| VERY IMPORTANT/ QUITE SIGNIFICANT | 3 |

FIG. 15D

<KEYWORD-RELATED WEIGHT TABLE>

| CONFIDENTIALITY | WEIGHT (Cw) |
|---|---|
| CONFIDENTIALITY: MEDIUM | 2 |
| CONFIDENTIALITY: HIGH | 3 |

FIG. 16

<KEYWORD RECORDING DB>

| KEYWORD | RELEVANT INFORMATION | DEGREE OF ASSOCIATION | SEARCH FREQUENCY | APPEARANCE FREQUENCY |
|---|---|---|---|---|
| PROJECT A | A COMPANY | 10 | 15 | 15 |
| | MR. YAMAGUCHI, MANAGER | 5 | | |
| | DECEMBER 31, 2009 | 1 | | |
| | LATITUDE A, LONGITUDE A | 2 | | |
| JANUARY X | BIRTHDAY | 20 | 10 | 30 |
| | AAA (NAME) | 10 | | |
| | HAPPY BIRTHDAY | 25 | | |
| | LATITUDE B, LONGITUDE B | 10 | | |
| | LATITUDE C, LONGITUDE C | 20 | | |

FIG. 17

<COMMAND DB>

| VOICE | OPERATION |
|---|---|
| TASK LIST | DISPLAY OPERATION TASK LIST |
| AUDIO RECORDING LIST | DISPLAY AUDIO RECORDING LIST |
| CONVERSION | CONVERTING OPERATION |
| ... | ... |

FIG. 22

<SECURITY-GUARANTEEABLE RANGE DB>

| NAME | LATITUDE | LONGITUDE |
|---|---|---|
| HEAD-QUARTER | NORTH LATITUDE: X DEGREES, X MINUTES, X SECONDS | EAST LONGITUDE: X DEGREES, X MINUTES, X SECONDS |
| | NORTH LATITUDE: X DEGREES, X MINUTES, X SECONDS | EAST LONGITUDE: X DEGREES, X MINUTES, X SECONDS |
| BRANCH OFFICE A | NORTH LATITUDE: X DEGREES, X MINUTES, X SECONDS | EAST LONGITUDE: X DEGREES, X MINUTES, X SECONDS |
| | NORTH LATITUDE: X DEGREES, X MINUTES, X SECONDS | EAST LONGITUDE: X DEGREES, X MINUTES, X SECONDS |
| ... | ... | ... |

FIG. 23

<AMBIGUOUS WORD DB>

| VOICE | OPERATION |
|---|---|
| THAT MATTER | PERFORM DISPLAY, BASED ON WHO HAS SPOKEN THE WORDS, AND ON APPEARANCE FREQUENCY |
| MATTER IN QUESTION | PERFORM DISPLAY, BASED ON WHO HAS SPOKEN THE WORDS, AND ON APPEARANCE FREQUENCY |
| MATTER RELATED TO (PLACE NAME) | PERFORM DISPLAY, BASED ON WHO HAS SPOKEN THE WORDS, AND ON RELEVANT INFORMATION SUCH AS THE LOCATION |
| MATTER RELATED TO (TIME) | PERFORM DISPLAY, BASED ON WHO HAS SPOKEN THE WORDS, AND RELEVANT INFORMATION SUCH AS DATE |
| ... | ... |

INFORMATION PROCESSING DEVICE, PORTABLE DEVICE AND INFORMATION PROCESSING SYSTEM

This is a Division of application Ser. No. 13/575,612 filed Jul. 27, 2012 (now U.S. Pat. No. 9,013,399), which in turn is a National Phase application, which claims the benefit of International Application No. PCT/JP2011/052446 filed Feb. 4, 2011, which claims the benefit of Japanese Patent Application Nos. 2010-033982, 2010-033985, 2010-033988, 2010-033997, 2010-034003, and 2010-034013 filed Feb. 18, 2010. The disclosure of the prior applications are hereby incorporated by reference herein in their entireties.

TECHNICAL FIELD

The present invention relates to information processing devices, portable devices, and information processing systems.

BACKGROUND ART

Portable information terminals that assist users have been suggested. For example, Patent Document 1 discloses a technique by which a user records an audio message into a first server via a portable telephone, the recorded message is divided into several partial messages, each of the partial messages after the division are converted into a text by outside secretaries, and the texts are stored into a second server, to manage a schedule for the user.

Also, Patent Document 2 discloses a technique by which an audio input unit and a communication unit are provided in a portable information terminal, a voice input from the audio input unit is transmitted to a voice recognition server via the communication unit, and the portable information terminal receives text information generated from the voice at the voice recognition server.

PRIOR ART DOCUMENTS

Patent Documents

Patent Document 1: Japanese Unexamined Patent Application Publication No. 2006-309356
Patent Document 2: Japanese Unexamined Patent Application Publication No. 7-222248

SUMMARY OF THE INVENTION

Problems to be Solved by the Invention

In conventional portable information terminals, however, security is not sufficiently taken into account, and operations are complicated. Therefore, it cannot be said that those portable information terminals are user-friendly.

The present invention has been made in view of the above problems, and the object thereof is to provide a user-friendly information processing device having security guaranteed, and a portable device and an information processing system with increased user friendliness.

A first information processing device of the present invention comprises: an input unit to which information is input; an extracting unit extracting predetermined words from the information input to the input unit; a classifying unit classifying the words extracted by the extracting unit into a first word and a second word; and a converting unit converting the first word by a first conversion method and converting the second word by a second conversion method, the second conversion method being different from the first conversion method.

In this case, the input unit may include a communication unit communicating with an external information processing device, and a result converted by the converting unit may be transmitted to the external information processing unit by the communication unit.

Also, the first information processing device may be configured so that the input unit includes an audio input unit to which audio information is input. In this case, the first information processing device may further comprises a text data generating unit generating text data from the audio information, wherein the extracting unit extracts the predetermined words from the text data generated by the text data generating unit. Further, the information processing device may be configured so that the input unit includes a text data input unit to which text data is input.

The first information processing device of the present invention may be configured so that the classifying unit classifies a word to be used in a business situation as the first word, and a word to be used in one's private time as the second word. Further, the converting unit may convert the first word and the second word into words with broad concepts, and may convert the first word into a word with a broader concept than the second word. Also, the converting unit may convert at least part of the first word and the second word into an initial. In this case, the converting unit may vary length of a portion to be converted into the initial between the first conversion method and the second conversion method. Also, in this case, when a word to be converted by the converting unit is a person's name, both a first name and a family name may be converted into initials by the first conversion method, and one of the first name and the family name may be converted into an initial by the second conversion method.

Also, the first information processing device of the present invention may be configured so that, when a word to be converted by the converting unit is a place name, the place name is converted into information about a predetermined zone by the first conversion method, and the place name is converted into information about a smaller zone than the predetermined zone by the second conversion method.

A second information processing device of the present invention comprises: a display unit displaying information; an input unit to which a voice is input; and a control unit controlling the display unit to display information related to the voice, in accordance with a result of an analysis on the voice.

In this case, the control unit may control the display unit to display the information related to the voice, in accordance with a result of an analysis carried out by an analyzing unit analyzing a voiceprint of the voice. Also, the control unit may control the display unit to display information related to a predetermined word contained in the voice, in accordance with the result of the analysis carried out by the analyzing unit. In this case, the control unit may control the display unit to display the information related to the predetermined word, in accordance with a frequency at which a voice is input together with the predetermined word to the input unit.

The second information processing device of the present invention may be configured to further comprise a location detecting unit detecting location information, wherein the control unit controls the display unit to display information in accordance with the location information detected by the location detecting unit when the voice is input, the information being contained in the information in accordance with the result of the analysis on the voice. In this case, the control unit may control the display unit to display information in accordance with location information about a predetermined region, the information being contained in the location information detected by the location detecting unit when the voice is input.

Further, the second information processing device of the present invention may be configured to further comprise a location detecting unit detecting location information, wherein the control unit changes a display form on the display unit, in accordance with an output from the location detecting unit. In this case, when the voice input from the audio input unit contains information about a location detected by the location detecting unit, the control unit may control the display unit not to display the information related to the location.

The second information processing device of the present invention may be configured to further comprise a time detecting unit detecting time-related information, wherein the control unit performs the display on the display unit, taking into account the time-related information from the time detecting unit. In this case, the control unit may control the display unit to display information in accordance with a time detected by the time detecting unit when the voice is input, the information being contained in the information in accordance with the result of the analysis on the voice. In this case, the control unit may control the display unit to display information input within a predetermined period of time after the time detected by the time detecting unit when the voice is input.

The second information processing device of the present invention may be configured to further comprise a portable device including the display unit and the input unit.

The second information processing device of the present invention may be configured so that, when the voice input from the audio input unit contains date information, the control unit performs the display on the display unit based on the date information. Also, the second information processing device of the present invention may further comprise a calendar unit outputting date information, wherein the control unit performs the display on the display unit, based on the date information output from the calendar unit. Also, the information processing device of the present invention may be configured to further comprise a text data generating unit converting the voice input from the audio input unit into text data. Also, when the input information contains a specific keyword, the control unit may convert the specific keyword into a different term, and controls the display unit to display the different term. Also, the second information processing device of the present invention may be configured so that the control unit determines whether to perform the display on the display unit, based on whether the voice contains a fixed word, and on an intonation of the voice.

Also, the second information processing device of the present invention may be configured so that the control unit includes a weighting unit performing weighting based on at least one of volume, frequency, and meaning of the input voice, and a display form on the display unit is changed, based on the voice input from the audio input unit and the weighting performed by the weighting unit.

In this case, the weighting unit may use at least the frequency of the voice to identify a person who has emitted the voice, and may perform the weighting in accordance with the person.

Also, the information processing device of the present invention may be configured so that the weighting unit performs the weighting in accordance with a confidentiality determined from the meaning of the voice.

Also, when the information processing device includes a time detecting unit detecting time-related information, the control unit may perform the display on the display unit, putting priority to a result of the weighting performed by the weighting unit over the time-related information detected by the time detecting unit.

The second information processing device of the present invention may be configured so that the control unit performs the display on the display unit, based on the weighting performed on the text data.

The second information processing device of the present invention may be configured so that the control unit changes a sequence to display the input information, based on a result of the weighting. The second information processing device may further comprise a changing unit changing settings in the weighting unit. Further the control unit may change at least one of color, display size, and display font, based on a result of the weighting.

The second information processing device of the present invention may further comprise a setting unit allowing a user to set the weighting.

A third information processing device of the present invention comprises: an audio input unit to which a voice is input; a text data generating unit capable of converting the input voice into text data; and a control unit starting a conversion by the text data generating unit, in accordance with at least one of information related to the voice and information related to a user.

The third information processing device of the present invention may be configured so that, when the audio input unit inputs a specific frequency, the control unit starts the conversion by the text data generating unit. Also, when the audio input unit inputs a telephone-related frequency, the control unit may start the conversion by the text data generating unit. Also, when a frequency of a voice of a specific person is input, the control unit may start the conversion by the text data generating unit.

The third information processing device of the present invention may be configured to further comprise an acquiring unit acquiring a schedule, wherein the control unit starts the conversion by the text data generating unit, in accordance with the schedule acquired by the acquiring unit. In this case, the control unit may detect an ending time of the schedule, and, in accordance with the ending time, may start the conversion by the text data generating unit.

Also, the third information processing device of the present invention may be configured so that the control unit starts the conversion by the text data generating unit, based on biometric information about the user. In this case, the third information processing device of the present invention may further comprise a biometric information input unit to which the biometric information about the user is input.

Also, the third information processing device of the present invention may further comprise a time detecting unit detecting time information related to a time, wherein, when the time information detected by the time detecting unit matches a specific time, the control unit starts the conversion by the text data generating unit. In this case, the third information processing device may further comprise a location detecting unit detecting location information, wherein the control unit prohibits the conversion by the text data generating unit, in accordance with a result of the detection performed by the location detecting unit.

A portable device of the present invention comprises: an input unit performing an input; a display unit displaying information related to the input; a detecting unit detecting at least one of location information and time information; and a control unit restricting the display on the display unit, in accordance with the information detected by the detecting unit.

In this case, the detecting unit may be a location detecting unit detecting location information about the display unit, and when the control unit determines that security is not guaranteed based on an output from the location detecting unit, the control unit may restrict the display on the display unit.

In this case, when the control unit determines that security is guaranteed based on the output from the location detecting unit, the control unit may lift at least part of the restriction on the display on the display unit.

Also, the portable device of the present invention may be configured so that the detecting unit is a time detecting unit detecting time-related information, and when the control unit determines that security is not guaranteed based on an output from the time detecting unit, the control unit restricts the display on the display unit.

In this case, when the control unit determines that security is guaranteed based on the output from the time detecting unit, the control unit may lift at least part of the restriction on the display on the display unit.

The portable device of the present invention may be configured so that the input unit is an audio input unit to which a voice is input. In this case, the control unit may control the display unit to display information putting a restriction on the input voice.

The portable device of the present invention may be configured so that the input unit may be a keyboard device performing an input through a keyboard. In this case, the control unit may control the display unit to display information putting a restriction on information input from the keyboard.

A first information processing system comprises: the portable device: and a conversion device putting a display restriction on at least part of information input from the portable device.

A second information processing system comprises: an input unit to which a voice is input; a text data generating unit generating text data, based on the voice input to the input unit; an analyzing unit analyzing voiceprint data of the voice input to the input unit; and an erasing unit erasing the voice from which the text data has been generated by the text data generating unit, in accordance with a result of the analysis carried out by the analyzing unit.

In this case, the second information processing system may further comprise: an extracting unit extracting predetermined words from the voice input to the input unit; a classifying unit classifying the words extracted by the extracting unit into a first word and a second word; a converting unit converting the first word by a first conversion method, and converting the second word by a second conversion method, the second conversion method being different from the first conversion method.

Also, the second information processing system of the present invention may be configured so that the analyzing unit carries out an analysis to determine whether voiceprint data of the voice is voiceprint data of a registered user, and the erasing unit erases a voice of a person other than the registered user, based on the result of the analysis carried out by the analyzing unit. Also, the erasing unit may vary the period of time from the analysis carried out by the analyzing unit to the erasing, between a voice of the registered user and a voice of a person other than the registered user.

Also, the information processing system of the present invention may further comprise a warning unit issuing a warning when the text data generating unit fails to generate text data from the voice. The second information processing system may further comprise a reproducing unit reproducing the voice when the text data generating unit fails to generate text data from the voice, wherein the erasing unit erases the voice reproduced by the reproducing unit, in accordance with the result of the analysis carried out by the analyzing unit. In this case, after a predetermined period of time has passed after the reproduction, the erasing unit may erase the voice reproduced by the reproducing unit, in accordance with the result of the analysis carried out by the analyzing unit.

The second information processing system of the present invention may further comprise a portable-terminal housing including the reproducing unit, the portable-terminal housing being portable.

Effects of the Invention

The present invention can advantageously provide an information processing device having security guaranteed and user friendliness increased, and a portable device and an information processing system with increased user friendliness.

BRIEF DESCRIPTION OF DRAWINGS

FIGS. 2A through 2D are flowcharts showing operations to record voices that are input from an audio input unit;

FIG. 3 is a diagram showing a voiceprint DB;

FIG. 5 is a diagram showing a storage data DB;

FIG. 7 is a diagram showing a keyword DB;

FIG. 11 is a diagram showing a specific conversion word DB;

FIG. 13 is a diagram showing a place name DB;

FIG. 14 is a diagram showing a keyword storage DB;

FIGS. 15A through 15D are diagrams showing examples of weight tables;

FIG. 16 is a diagram showing a keyword recording DB;

FIG. 17 is a diagram showing a command DB;

FIG. 22 is a diagram showing a security-guaranteeable range DB;

FIG. 23 is a diagram showing an ambiguous word DB;

MODES FOR CARRYING OUT THE INVENTION

Figure 1:
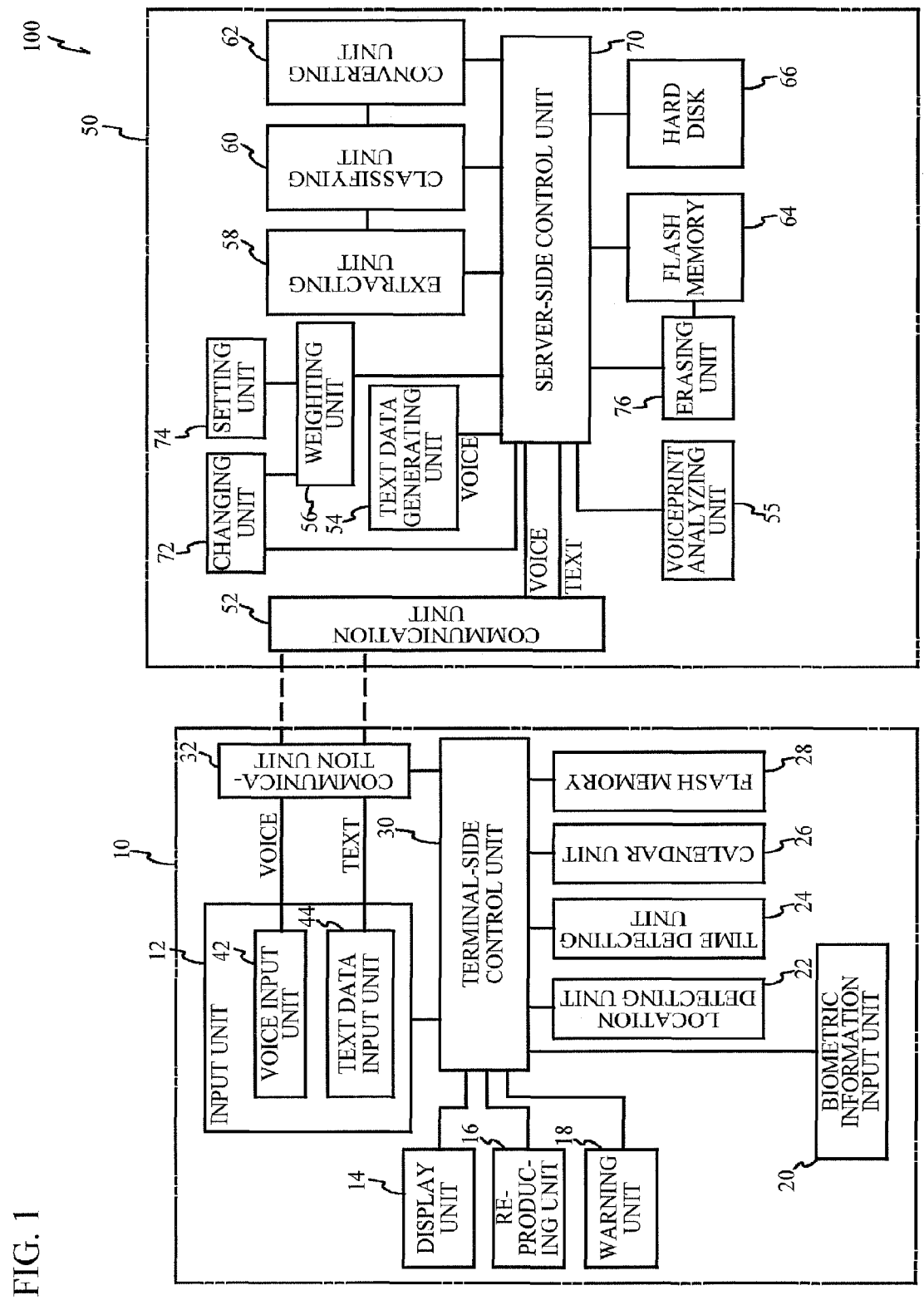
FIG. 1 is a functional block diagram of a personal assistant system 100 according to an embodiment.

Referring to FIGS. 1 through 25, an embodiment of a personal assistant system 100 is described below in detail. FIG. 1 is a block diagram of the personal assistant system 100. As shown in FIG. 1, the personal assistant system 100 includes a portable terminal 10 and a server 50.

The portable terminal 10 is a terminal a user can carry around, and may be a portable telephone, a smartphone, a PHS (Personal Handy-phone System), or a PDA (Personal Digital Assistant), for example. The size of the portable terminal 10 is such that the portable terminal 10 can be put into a breast pocket, for example. As shown in FIG. 1, the portable terminal 10 includes an input unit 12, a display unit 14, a reproducing unit 16, a warning unit 18, a biometric information input unit 20, a location detecting unit 22, a time detecting unit 24, a calendar unit 26, a flash memory 28, a communication unit 32, and a terminal-side control unit 30. The portable terminal 10 has a portable terminal housing that houses at least part of those components and can be carried around.

The input unit 12 includes an audio input unit 42 and a text data input unit 44. The audio input unit 42 includes a microphone, and collects the voice of a user and the sound generated around the user. The text data input unit 44 includes an input interface such as a keyboard or a touch panel, and collects text data in accordance with input operations by the user. It should be noted that the input unit 12 also has the function to receive operation instructions from the user through a touch panel or the like.

The display unit 14 includes a display such as a liquid crystal display or an organic EL display. The display unit 14 displays data such as image data or text data to the display, or displays a menu for the user to perform operations.

The reproducing unit 16 includes a speaker, and outputs voice and sound. The warning unit 18 issues a warning to the user when an error occurs in the portable terminal 10 or the like. For example, the warning unit 18 outputs warning sound via the reproducing unit 16 or displays a warning via the display unit 14.

The biometric information input unit 20 obtains at least one piece of biometric information such as the state of the muscles (tension or relaxation), blood pressure, heart rate, pulse, and body temperature of the user, and inputs the obtained information to the terminal-side control unit 30. The method of detecting the biometric information may be the watch-type method disclosed in Japanese Unexamined Patent Application Publication No. 2005-270543. The blood pressure and pulse may be detected by a pulse wave sensor using infrared rays, and the heart rate may be detected by a vibration sensor. When the heart rate is higher than normal, the user is in a tense state. When the heart rate is low, the user is in a relaxed state. In a tense state, the pupil size becomes larger. In a relaxed state, the pupil size becomes smaller. Therefore, the pupil size may be detected to determine whether the user is in a tense state or in a relaxed state.

The location detecting unit 22 detects the location (the absolute location) of the user, and a GPS (Global Positioning System) is used, for example. It should be noted that an absolute localization system using an RFID (Radio Frequency IDentification) or the like may be used as the location detecting unit 22.

The time detecting unit 24 has a timing function to detect current time. The calendar unit 26 stores dates associated with the days of the week. The flash memory 28 is a memory for temporarily storing data. The communication unit 32 includes a wireless LAN unit for accessing access points via WiFi communication, a line connection unit with an Ethernet (a registered trade name) cable, or a USB connection unit that performs communications with an external device such as a computer. In this embodiment, the communication unit 32 can perform communications with a communication unit 52 of the server 50.

The terminal-side control unit 30 collectively controls the respective components of the portable terminal 10, and performs operations in the portable terminal 10. For example, the terminal-side control unit 30 obtains the time at which audio data is input to the audio input unit 42 through the time detecting unit 24, and obtains the location of the portable terminal 10 at the time of the input of the audio data through the location detecting unit 22. When transmitting the audio data to the server 50, the terminal-side control unit 30 transmits the information about the time and location together with the audio data.

The server 50 is installed in the office where the user of the portable terminal 10 works, for example. However, the location is not limited to that, and the server 50 may be installed in an office of a system management company. As shown in FIG. 1, the server 50 includes the communication unit 52, a text data generating unit 54, a voiceprint analyzing unit 55, a weighing unit 56, an extracting unit 58, a classifying unit 60, a converting unit 62, a flash memory 64, a hard disk 66, and a server-side control unit 70.

The communication unit 52 is the same as the communication unit 32 in the portable terminal 10. In this embodiment, the communication unit 52 can perform communications with the communication unit 32 in the portable terminal 10. Data (audio data or text data) received by the communication unit 52 is stored into the flash memory 64 via the server-side control unit 70. That is, the communication unit 52 functions as an audio input unit or a text data input unit in the server 50.

The text data generating unit 54 obtains the audio data stored in the flash memory 64, and converts the audio data to generate text data. The generated text data is stored into the flash memory 64 via the server-side control unit 70.

The voiceprint analyzing unit 55 carries out a voiceprint analysis by matching a voiceprint pattern against registered voiceprint data, using the volume (intensity), frequency, and duration of the voice. The voiceprint analyzing unit 55 then identifies the person who emitted the voice. It should be noted that, in the voiceprint analysis, it is not necessary to use all the volume (intensity), frequency, and duration of the voice, but it is possible to identify the person who emitted the voice by using at least the frequency of the voice.

The weighting unit 56 obtains the audio data stored in the flash memory 64 and the text data generated from the audio data, or text data input from the text data input unit 44. The weighting unit 56 then performs weighting on each piece of text data. The weighting unit 56 stores the numerical value (the task priority level) obtained through the weighting, together with the text data, into the flash memory 64.

The weighting by the weighting unit 56 is performed based on the volume and frequency of the voice and the meaning of the text data, for example. Specifically, the weighting unit 56 performs weighting in accordance with the result (the information about who emitted the voice) of the analysis carried out by the voiceprint analyzing unit 55 based on the volume and frequency of the voice, and performs weighting in accordance with the confidentiality of the meaning of the text data. It should be noted that, in this embodiment, "confidentiality" means a preference for avoidance of exposure to others (an anonymous third party).

A changing unit 72 and a setting unit 74 are connected to the weighting unit 56. The changing unit 72 changes the settings for the weighting to be performed by the weighting unit 56. The setting unit 74 changes the settings for the weighting to be performed by the weighting unit 56, based on an instruction from the user. The setting unit 74 may change the settings, based on a user instruction input from an input unit (such as a keyboard) of the server. Alternatively, the setting unit 74 may change the settings, receiving a user instruction input from the input unit 12 of the portable terminal 10 via the communication units 52 and 32.

The extracting unit 58 extracts predetermined words from the text data stored in the flash memory 64. That is, the extracting unit 58 extracts the predetermined words from the information input to the input unit 12 of the portable terminal 10. The predetermined words are words preferably not to be seen by others, or words with relatively high confidentialities. This words are set beforehand in a keyword DB (see FIG. 7) stored in the hard disk 66.

The classifying unit 60 classifies the words extracted by the extracting unit 58 into words with high confidentiality levels (first words) and words with slightly high confidentiality levels (second words). This classification is performed based on the keyword DB (see FIG. 7) stored in the hard disk 66. The converting unit 62 converts the words with "High" confidentiality levels and the words with "Medium" confidentiality levels, on the basis of predetermined rules. The converting unit 62 stores the converted words into the flash memory 64.

The flash memory 64 temporarily stores data processed in the server 50. An erasing unit 76 is connected to the flash memory 64. Based on an instruction from the server-side control unit 70, the erasing unit 76 erases the audio data and text data stored in the flash memory 64 in predetermined timing. The specific timing to erase the data will be described later. Instead of the flash memory 64, some other volatile memory can be used.

Data such as the database to be used in various operations is stored in the hard disk 66. Instead of the hard disk 66, some other nonvolatile memory may be used.

The server-side control unit 70 collectively controls the respective components in the server 50, and performs operations in the server 50. The server 50 actually includes a CPU (Central Processing Unit), a ROM (Read Only Memory), a RAM (Random Access Memory), and the like. Programs stored (installed) in the ROM and the like are executed by the CPU, to realize the functions of the various components such as the above described text data generating unit 54, weighting unit 56, extracting unit 58, classifying unit 60, converting unit 62, and voiceprint analyzing unit 55.

Referring now to FIGS. 2 through 25, operations in the personal assistant system 100 of this embodiment are described in detail.

Referring first to FIGS. 2A through 2D, operations (audio recording operations) to store the voice input from the audio input unit 42 into the flash memory 64 in the server 50 are described. It should be noted that an audio recording operation of course may be constantly performed. However, to reduce the power consumption and perform effective audio recording, at least two or only one of the operations illustrated in FIGS. 2A through 2D may be performed in this embodiment.

Audio Recording Timing Example 1

FIG. 2A is a flowchart showing an operation to perform audio recording only while a person is emitting voice. It should be noted that voice that is input to the audio input unit 42 is input to the server-side control unit 70 via the communication units 32 and 52.

In the operation of FIG. 2A, the server-side control unit 70 determines, in step S10, whether a voice has been input from the audio input unit 42. If the determination result is positive, the voiceprint analyzing unit 55 carries out a voiceprint analysis on the input voice under the instruction of the server-side control unit 70 in step S12. In this voiceprint analysis, the input audio data is matched against the audio data contained in a voiceprint DB (see FIG. 3) stored in the hard disk 66 (pattern matching), to identify the person who emitted the input voice. In the voiceprint DB of FIG. 3, the voiceprint data about the person is associated with the person's name. In a case where this system is used for business purposes, for example, the voiceprint data about all the employees of the company can be registered in the voiceprint DB. In a case where this system is for personal use, each user can register the voiceprint data about the family members, relatives, and friends in the voiceprint DB. This registration can be performed from the audio input unit 42 of the portable terminal 10.

Next, in step S14, the server-side control unit 70 determines whether the person is identified in step S12, or whether the input voice is the voice of the person registered in the voiceprint DB. If the determination result is positive, the server-side control unit 70 starts audio recording (performing storing into the flash memory 64) in step S16. Since the recorded data is converted into text data by the text data generating unit 54, it can be said that the timing to start the audio recording is also the timing to generate text data. If the determination result of step S14 is negative, on the other hand, the operation returns to step S10.

After the determination result of step S14 is positive and the operation moves on to step S16, the server-side control unit 70 continues the audio recording until the audio input stops for a predetermined seconds in step S18. If the audio input stops for the predetermined seconds, or if the audio input is considered to have ended, the determination result of step S18 becomes positive. After the determination result of step S18 becomes positive, the terminal-side control unit 30 ends the audio recording in step S20, and the operation returns to step S10.

After that, the above described procedures are repeated, so that audio recording is performed every time a person registered in the voiceprint DB emits voice. It should be noted that the person who determines the timing to perform audio recording may be managed in a different DB from the voiceprint DB. With this arrangement, the person who determines the timing to perform audio recording can be limited to a conference organizer, for example.

In FIG. 2A, audio recording is started when a person emits voice, based on the voiceprint of the voice. However, the present invention is not limited to that, and audio recording may be started when a telephone related frequency (such as the frequency of a ring tone) is input to the audio input unit 42, for example. In this manner, audio recording can be performed, without missing any telephone conversation.

Audio Recording Timing Example 2

FIG. 2B is a flowchart showing an operation to perform audio recording at a time registered in advance. The operation of FIG. 2B differs from the operation of FIG. 2A in that transmission of audio data from the communication unit 32 in the portable terminal 10 to the server 50 is switched on and off, to switch audio recording timings.

In FIG. 2B, the terminal-side control unit 30 detects the current time via the time detecting unit 24 in step S24. Next, in step S26, the terminal-side control unit 30 determines whether the current time is a predetermined time to start audio recording. Here, the time to start audio recording may be determined beforehand at the time of shipment of the portable terminal 10, or may be input beforehand from the input unit 12 by a user or the like. The time to start audio recording may be set in a period of time during which there are frequent conversations between persons, and the amount of information is large (such as a 1-hour period immediately after the start of the business day), or in a period of time during which workers tend to have a lapse of concentration (such as 30 minutes before and after lunch break, or overtime hours during which the workers are exhausted (after 8:00 p.m., for example)).

If the determination result of step S26 is positive, the operation moves on to step S28. The communication unit 32 starts transmitting the audio data input to the audio input unit 42 to the server 50, under the instruction of the terminal-side control unit 30. In this case, the audio data is stored (recorded) into the flash memory 64 via the communication unit 52 and the server-side control unit 70.

Next, in step S30, the terminal-side control unit 30 detects the current time via the time detecting unit 24. In the next step S32, the terminal-side control unit 30 determines whether the current time is a predetermined time to end audio recording. If the determination result herein is positive, the operation moves on to step S34. If the determination result is negative, on the other hand, the operation returns to step S30. If the operation moves on to step S34, the communication unit 32 stops the audio data transmission to the server 50, under the instruction of the terminal-side control unit 30. Accordingly, the audio recording comes to an end. After that, the operation returns to step S24, and the above described procedures are repeated. In this manner, audio recording can be performed every time a time to start audio recording comes.

Audio Recording Timing Example 3

FIG. 2C is a flowchart showing an operation to perform audio recording at the end of a conference that is registered in advance. In the operation of FIG. 2C, audio recording timings are switched by switching on and off audio data transmission from the communication unit 32 to the server 50, as in the operation of FIG. 2B.

In FIG. 2C, the terminal-side control unit 30 detects the current time via the time detecting unit 24 in step S36. Next, in step S38, the terminal-side control unit 30 extracts a conference schedule from a task list (described later) stored in the flash memory 28, and determines whether the current time is a predetermined period of time (10 minutes, for example) before the time to end the conference. If the determination result herein is positive, audio recording is started in step S40 in the same manner as in step S28 of FIG. 2B.

In the next step S42, the terminal-side control unit 30 detects the current time via the time detecting unit 24. In the next step S44, the terminal-side control unit 30 determines whether the current time is the conference ending time used in the determination in step S38. If the determination result herein is positive, the operation moves on to step S46. If the determination result is negative, on the other hand, the operation returns to step S42. If the operation moves on to step S46, the communication unit 32 stops the audio data transmission to the server 50, under the instruction of the terminal-side control unit 30. After that, the operation returns to step S36, and the above described procedures are repeated. In this manner, audio recording can be performed during the predetermined period of time at the end of the conference. It should be noted that audio recording is performed at the end of a conference, because there is a high possibility that a conclusion is drawn from the conference, or the next conference schedule is announced.

In the operation of FIG. 2C, audio recording may be performed over the duration of the conference. If the chairperson and the presenters of the conference are registered in the task list, only the voices of the registered chairperson and presenters may be recorded by combining the operation of FIG. 2C with the operation of FIG. 2A.

Audio Recording Timing Example 4

FIG. 2D is a flowchart showing an operation to perform audio recording based on information (the state of the muscles (tension or relaxation) of the user in this example) that is input from the biometric information input unit 20. In this operation of FIG. 2D, audio recording timings are switched by switching on and off audio data transmission from the communication unit 32 to the server 50, as in the operations of FIGS. 2B and 2C.

In FIG. 2D, the terminal-side control unit 30 obtains the state of the user's muscles via the biometric information input unit 20 in step S50. Next, in step S52, the terminal-side control unit 30 compares the state of the muscles with a predetermined threshold value, and determines whether the muscles are in a predetermined relaxed state. If the determination result herein is positive, audio recording is started in step S54 in the same manner as in step S28 of FIG. 2B.

In the next step S56, the terminal-side control unit 30 again obtains the state of the muscles. In the next step S58, the terminal-side control unit 30 compares the state of the muscles with a predetermined threshold value, and determines whether the muscles are in a predetermined tense state. If the determination result herein is positive, the operation moves on to step S60. If the determination result is negative, the operation returns to step S56. If the operation moves on to step S60, the communication unit 32 stops the audio data transmission to the server 50, under the instruction of the terminal-side control unit 30. After that, the operation returns to step S50, and the above described procedures are repeated. Through the above procedures, the tension of the user is determined from the state of the muscles, and automatic audio recording can be performed in a situation where the user is too relaxed to listen to others talk (where the user is sleeping, for example).

In FIG. 2D, voice is recorded only when the user is too relaxed. However, voice may be recorded when the user is relaxed or tense to some degree, or only when the user is tense to some degree. When the user is tense to some degree, there is a high possibility that something important is being discussed.

It should be noted that at least one of a perspiration sensor and a pressure sensor is attached to the receiver (a portable terminal housing), and a check may be made to determine whether the user is in a tense state or a relaxed state from the amount of perspiration of the hand holding the receiver and/or the grip strength of the hand holding the receiver.

The outputs of the perspiration sensor and the pressure sensor may be transmitted to the terminal-side control unit 30, and audio recording by the audio input unit 42 may be started when the terminal-side control unit 30 determines that the user is in a tense state or a relaxed state.

The perspiration sensor includes electrodes, and measures the impedance of the hand. Emotional sweating caused by sensation, excitement, or tension is small in amount and short in duration. Therefore, the perspiration sensor should be attached to the portion of the receiver corresponding to the center of the palm where the amount of perspiration is larger than that at the fingers.

The pressure sensor may be a capacitance sensor, a distortion gauge, or an electrostrictive element. When the user holds the receiver with a pressure 10% or more higher than the pressure with which the user normally holds the receiver, the user may be determined to be in a tense state.

Also, at least one of the perspiration sensor and the pressure sensor may be attached to the portable terminal 10, such as a portable telephone.

It should be noted that, even when the current time is the time to start audio recording in the operations of FIGS. 2A through 2D, audio recording may not be started if the portable terminal 10 is located in an audio recording prohibited position, for example. An audio recording prohibited position may be an office of a company other than the company for which the user works, for example.

(Audio Data Processing)

Figure 4:
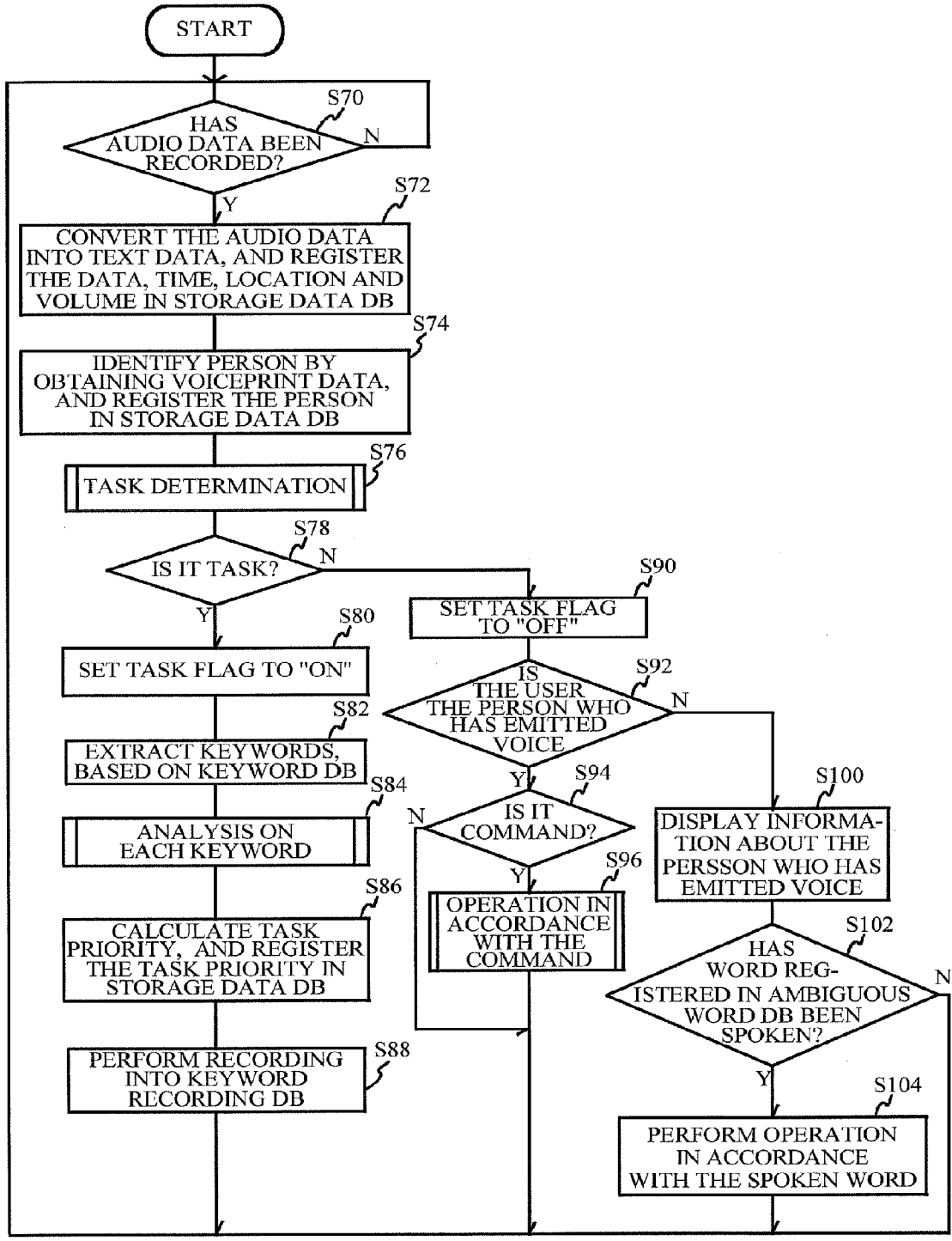
FIG. 4 is a flowchart related to audio data processing.

Referring now to FIGS. 4 through 23, audio data processing to be performed after audio data is recorded is described. FIG. 4 is a flowchart about the audio data processing.

In step S70 of FIG. 4, the server-side control unit 70 determines whether audio data has been recorded into the flash memory 64. If the determination result herein is positive, the operation moves on to step S72, and the text data generating unit 54 converts the audio data into a text under the instruction of the server-side control unit 70. In this case, every time audio data input stops for a predetermined period of time, audio data is converted into a text. The server-side control unit 70 also registers the data (text data) about the text converted from the audio data, the time when the audio data is input to the audio input unit 42, the location where the audio data is input, and the audio volume level of the audio data in a storage data DB (FIG. 5) in the flash memory 64. The time and location information registered here is transmitted together with the audio data from the communication unit 32, as described above. Next, in step S74, the voiceprint analyzing unit 55 analyzes the voiceprint to identify the person who emitted the voice, under the instruction of the server-side control unit 70. The voiceprint analyzing unit 55 registers the identified person in the storage data DB. If the procedure of step S12 of FIG. 2A has already been carried out, step S74 may be skipped, and the contents of step S12 may be registered in the storage data DB.

FIG. 5 shows the data structure of the storage data DB. In the storage data DB, the above mentioned time, location, text data, speaker, audio volume level, and a task flag and a task priority are stored. The task flag and the task priority will be described later.

Figure 6:
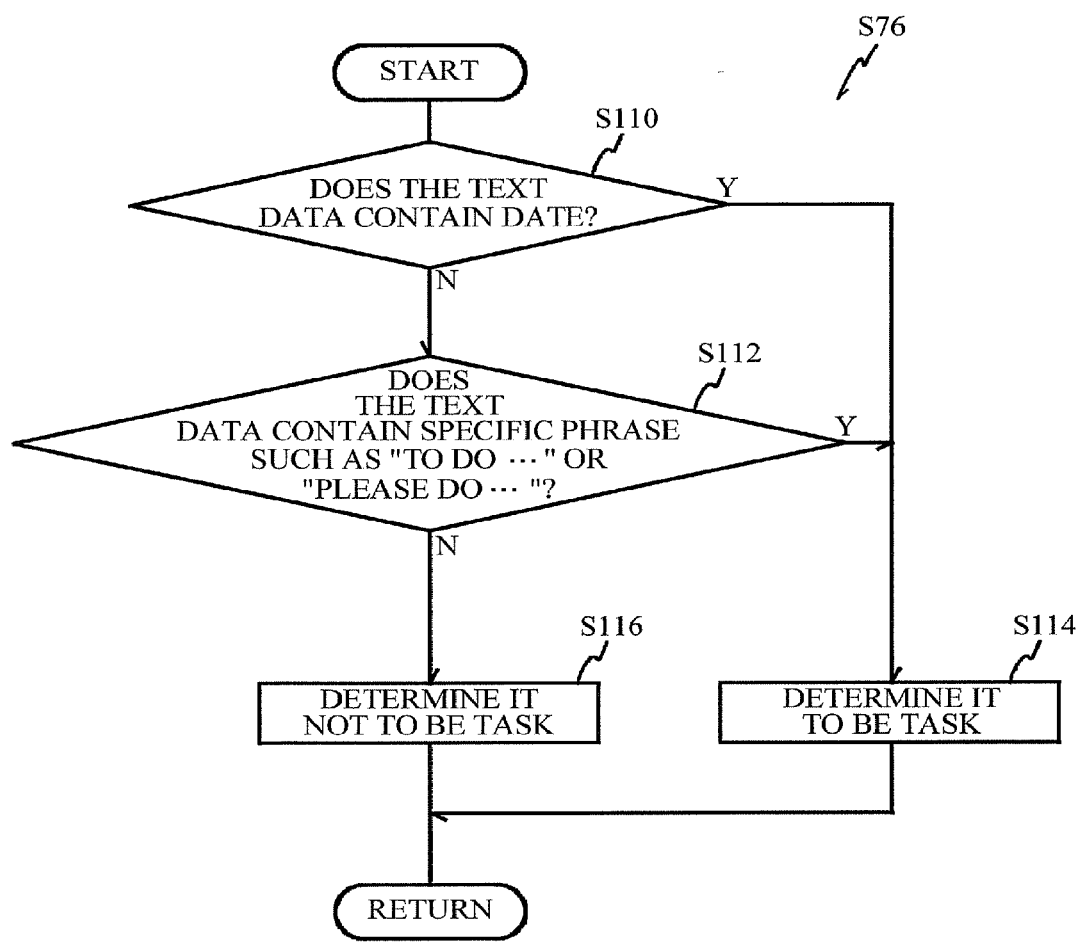
FIG. 6 is a flowchart showing a specific operation to be performed in step S76 of FIG. 4.

Referring back to FIG. 4, in the next step S76, a task determining subroutine is executed. In the task determining subroutine, the operation of FIG. 6 is performed as an example. In the operation of FIG. 6, the server-side control unit 70 determines whether the text data contains a date. Here, the date contains a specific date such as "year, month, day, and time", as well as date information such as "tomorrow", "the day after tomorrow", "morning", or "afternoon". If the determination result herein is positive, the operation moves on to step S78 of FIG. 4 after the contents of the text data is determined to be a task in step S114. If the determination result is negative, on the other hand, the operation moves on to step S112.

In step S112, the server-side control unit 70 determines whether the text data contains a specific phrase. Here, a specific phrase is a task related phrase, such as "to do . . . ", "please do . . . ", "do . . . (or "will you do . . . " or "you should do . . . "), "let's do . . . (or "shall we do . . . "), "we will do . . . ", or "we plan to do . . . ". Those specific phrases may be stored as a table beforehand in the hard disk 66 at the time of shipment of the device, or may be added by the user as needed. If the determination result of step S112 is positive, the operation moves on to step S78 of FIG. 4 after the contents of the text data is determined to be a task in step S114. If the determination result of step S112 is negative, on the other hand, the operation moves on to step S78 of FIG. 4 after the contents of the text data is determined not to be a task.

Referring back to FIG. 4, in step S78, the server-side control unit 70 determines whether the contents of the text data has been determined to be a task, based on the result of the operation of FIG. 6. In the following, an operation to be performed when the determination result of step S78 is positive, and an operation to be performed when the determination result of step S78 is negative are described.

(Where the Determination Result of Step S78 is Positive (where the Text Data Indicates a Task))

If the determination result of step S78 is positive, the operation moves on to step S80, and the server-side control unit 70 sets the task flag in the storage data DB (FIG. 5) to "on". Next, in step S82, the extracting unit 58 extracts keywords based on the keyword DB (FIG. 7) stored in the hard disk 66, under the instruction of the server-side control unit 70. As shown in FIG. 7, keywords are connected to specific information, attributes, and confidentiality levels of those keywords in the keyword DB. Therefore, based on the items of the keywords in the keyword DB, the extracting unit 58 extracts keywords registered in the keyword DB from the text data.

For example, assume that the text data indicates "Meeting on the Software Specification of Cool Blue Speaker 2, with Mr. Ichiro Aoyama of Dai-Tokyo Kabushiki Kaisha, 13:00, November 20".

In this case, the extracting unit 58 extracts the keywords, "Cool Blue Speaker 2", "Software", "Specification", "Dai-Tokyo Kabushiki Kaisha", and "Ichiro Aoyama", which are registered in the keyword DB of FIG. 7.

It should be noted that the keyword DB needs to be prepared in advance. The contents registered in the keyword DB can be added or changed as needed (at the time of maintenance, for example). In FIG. 7, keywords may be registered with attributes such as patent information, budget information, and business negotiation information, as well as the attributes such as individual name, company name, and technical terms.

Figure 8:
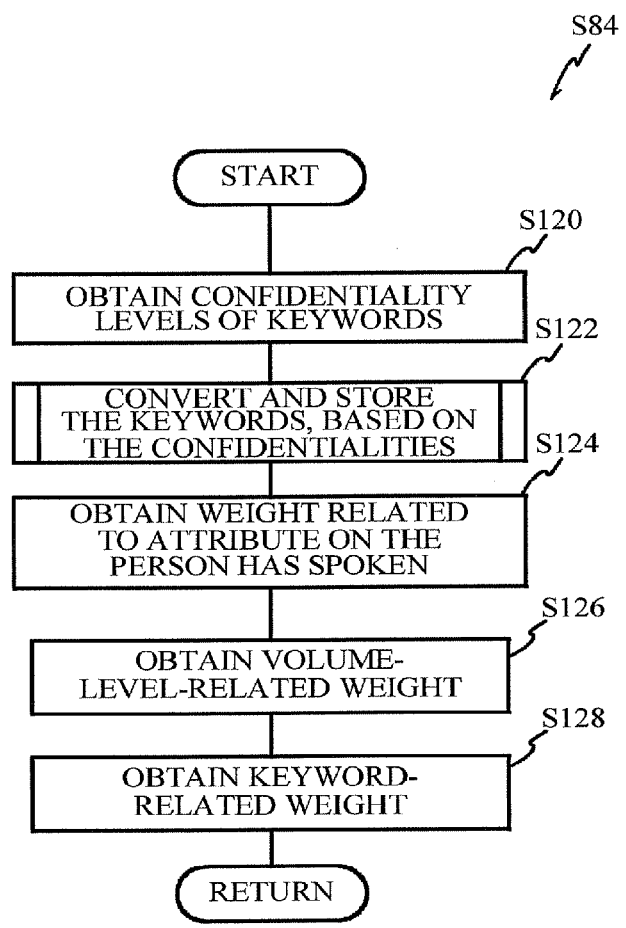
FIG. 8 is a flowchart showing a specific operation to be performed in step S84 of FIG. 4.

Referring back to FIG. 4, in the next step S84, an analysis subroutine for each keyword is executed. FIG. 8 is a flowchart showing a specific operation according to the analysis subroutine of step S84.

In FIG. 8, in step S120, the classifying unit 60 obtains the confidentiality levels of the keywords from the keyword DB, under the instruction of the server-side control unit 70. Specifically, the classifying unit 60 obtains the confidentiality level "Medium" of "Cool Blue Speaker 2", the confidentiality level "Medium" of "Software", the confidentiality level "Medium" of "Specification", the confidentiality level "High" of "Dai-Tokyo Kabushiki Kaisha", and the confidentiality level "High" of "Ichiro Aoyama" from the keyword DB.

Next, in step S122, the converting unit 62 executes a subroutine to convert the keywords based on the confidentialities obtained in step S120, and store the converted keywords into the flash memory 64, under the instruction of the server-side control unit 70.

Figure 9:
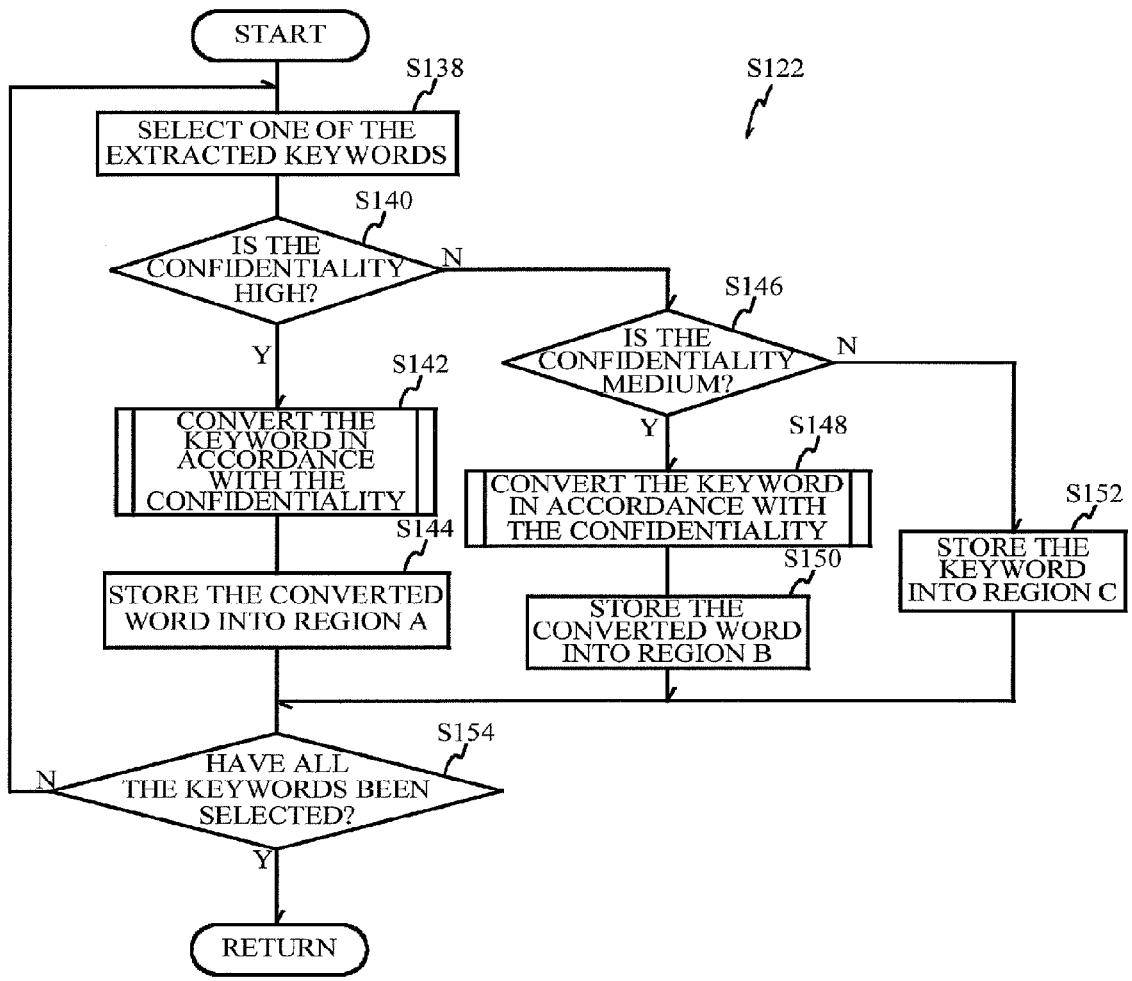
FIG. 9 is a flowchart showing a specific operation to be performed in step S122 of FIG. 8.

FIG. 9 is a flowchart showing a specific operation according to the subroutine of step S122. As shown in FIG. 9, the converting unit 62 first selects a keyword from the keywords extracted by the extracting unit 58 in step S138. Here, "Dai-Tokyo Kabushiki Kaisha" is selected, for example.

Next, in step S140, the converting unit 62 determines whether the confidentiality level of the selected keyword is "High". Since the confidentiality level of "Dai-Tokyo Kabushiki Kaisha" is "High" as described above, the determination result here is positive, and the operation moves on to step S142. In step S142, the converting unit 62 executes a subroutine to convert the keyword in accordance with the confidentiality. Specifically, an operation is performed according to the flowchart shown in FIG. 10.

Figure 10:
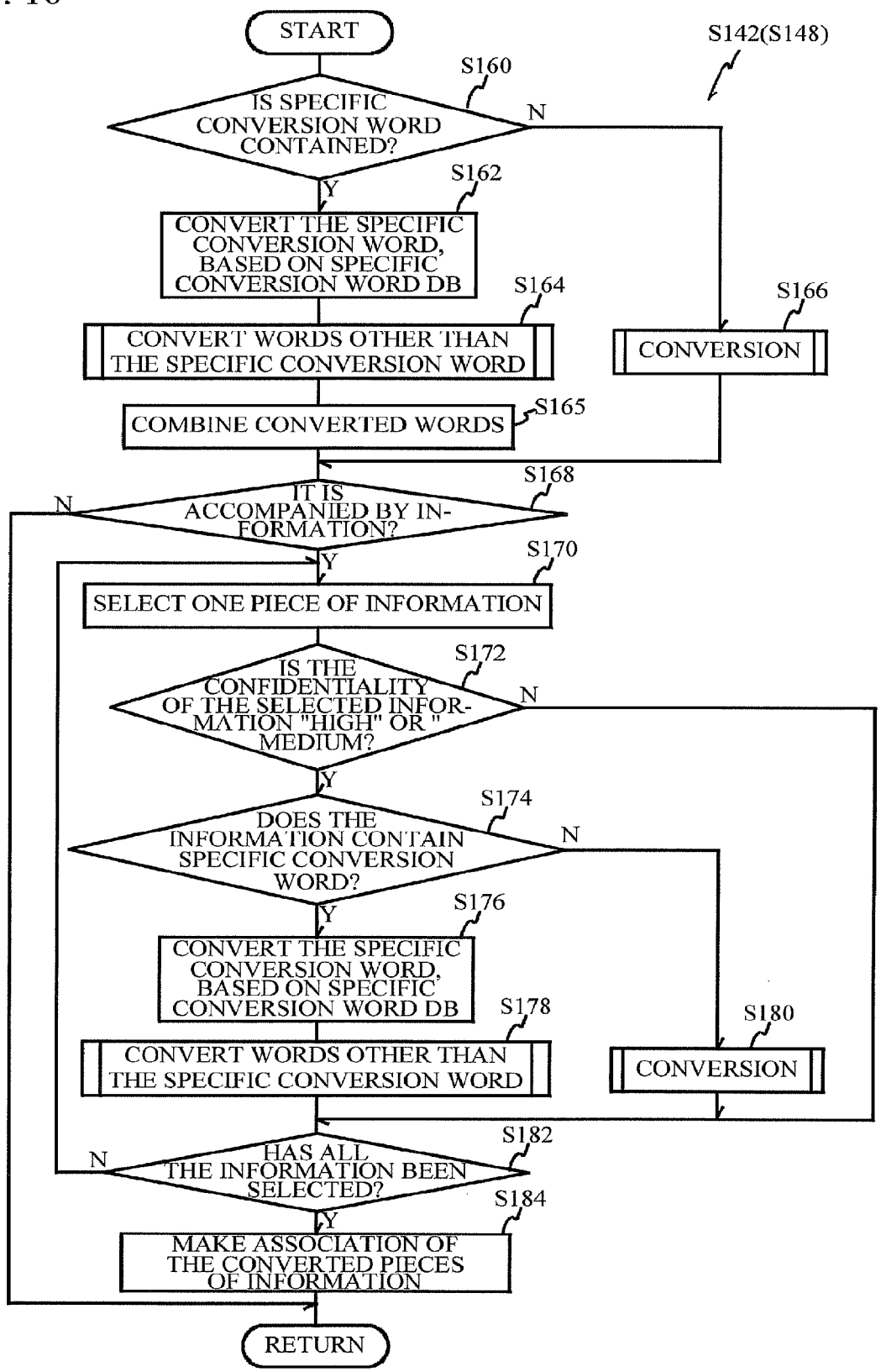
FIG. 10 is a flowchart showing a specific operation to be performed in steps S142 and S148 of FIG. 9.

In step S160 of FIG. 10, the converting unit 62 determines whether the selected keyword contains a specific conversion word. Here, a specific conversion word is a word defined in the specific conversion word DB shown in FIG. 11, such as a word often used in company names (such as "Kabushiki Kaisha", "Company Limited", "Co., Ltd." or "plc"), a word often used in the names of national institutes (such as "Inst.", "Ministry", or "Agency"), or a word often used in the names of educational institutes (such as "University" or "High School").

Since the selected keyword "Dai-Tokyo Kabushiki Kaisha" contains the specific conversion word "Kabushiki Kaisha", the determination result of step S160 is positive, and the operation moves on to step S162. In step S162, the converting unit 62 converts the specific conversion word, based on the specific conversion word DB. In this case, "Kabushiki Kaisha" of "Dai-Tokyo Kabushiki Kaisha" is converted into "Sha". Next, in step S164, a subroutine to convert words other than the specific conversion words is executed.

Figure 12:
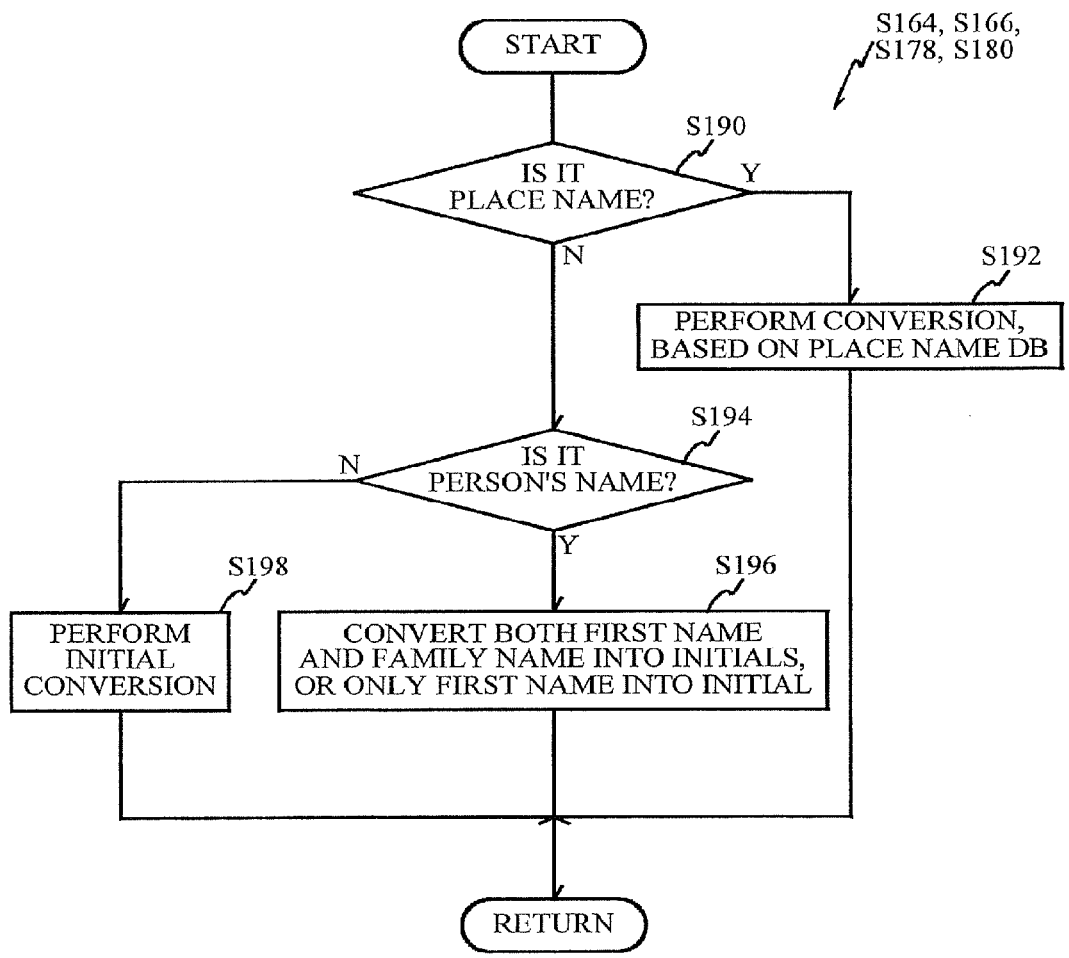
FIG. 12 is a flowchart showing a specific operation to be performed in steps S164, S166, S178, and S180 of FIG. 10.

FIG. 12 is a flowchart showing a specific operation according to the conversion subroutine of step S164. As shown in FIG. 12, in step S109, the converting unit 62 determines whether the portion to be converted (other than the specific conversion word) is the name of a place. Although the portion "Dai-Tokyo" to be converted contains the name of a place, the portion is not the name of a place as it is. Therefore, the determination result is negative, and the operation moves on to step S194.

In step S194, the converting unit 62 determines whether the portion to be converted is someone's name. Since the portion to be converted here is not someone's name, the determination result is negative, and the operation moves on to step S198. In step S198, the converting unit 62 converts the to-be-converted portion "Dai-Tokyo" into the initial "D". After the procedure of step S198 is completed, the operation moves on to step S165 of FIG. 10.

In step S165, the converting unit 62 combines the words converted in steps S162 and S164. Specifically, "D" and "Sha" are combined into "D-Sha".

Next, in step S168, the converting unit 62 determines whether the to-be-converted keyword "Dai-Tokyo Kabushiki Kaisha" is accompanied by information. Here, "being accompanied by information" means that information has been input to the column of "Information" in the keyword DB of FIG. 7. Since "Dai-Tokyo Kabushiki Kaisha" is accompanied by "Electronics; Shinagawa Ward, Tokyo", the determination result of step S168 is positive, and the operation moves on to step S170.

In step S170, the converting unit 62 selects one piece of information that has not been selected, from the accompanying information. Next, in step S172, the converting unit 62 determines whether the confidentiality level of the selected information ("Electronics", for example) is "High" or "Medium". If the confidentiality level of "Electronics" is "Low", the determination result of step S172 is negative, and the operation moves on to step S182. In step S182, the converting unit 62 determines whether all the information has already been selected. Since "Shinagawa Ward, Tokyo" has not been selected yet herein, the determination result is negative, and the operation returns to step S170.

Next, in step S170, the converting unit 62 selects the unselected information "Shinagawa Ward, Tokyo". In step S172, the converting unit 62 determines whether the confidentiality level of "Shinagawa Ward, Tokyo" is "High" or "Medium". As shown in the keyword DB of FIG. 7, the confidentiality level of the name of a place is defined as "Low" or as the same as the confidentiality level of the associated keyword. Therefore, "Shinagawa Ward, Tokyo" has the same confidentiality level "High" as that of "Dai-Tokyo Kabushiki Kaisha". Accordingly, the determination result of step S172 is positive, and the operation moves on to step S174. In step S174, the converting unit 62 determines whether "Shinagawa Ward, Tokyo" contains a specific conversion word. If the determination result herein is negative, the operation moves on to step S180, and a conversion subroutine to convert information is executed. The conversion subroutine of step S180 is basically the same as the above described procedures of step S164 (FIG. 12).

That is, in FIG. 12, the converting unit 62 determines whether "Shinagawa Ward, Tokyo" is the name of a place in step S190. If the determination result herein is positive, the converting unit 62 performs a converting operation based on the place name DB shown in FIG. 13 in step S192. Specifically, the converting unit 62 converts "Shinagawa Ward, Tokyo" into "South Kanto" by a conversion method for the confidentiality level "High". It should be noted that, in the place name DB of FIG. 13, the name of a subject place is expressed as a location in a relatively wide area if the confidentiality level is "High", and the name of the subject place is expressed as a location in a narrower area than that for the confidentiality level "High" if the confidentiality level is "Medium".

After the procedure of step S192 is completed, the operation moves on to step S182 of FIG. 10. In the stage of step S182, all the information (Electronics: Shinagawa Ward, Tokyo) has already been selected. Accordingly, the determination result of step S182 is positive, and the operation moves on to step S184. In step S184, the converting unit 62 associates the converted information with the converted keyword (step S165 or S166). Here, the information is turned into "D-Sha (Electronics; South Kanto)". After that, the operation moves on to step S144 of FIG. 9.

In step S144 of FIG. 9, the converted keyword is stored into a region A in a keyword storage DB (see FIG. 14) stored in the flash memory 64. It should be noted that, as shown in FIG. 14, storage regions O, B, and C, as well as the region A, are formed in the keyword storage DB. In the region O, raw keyword data (unconverted keywords) is stored. After the storing operation is completed, the operation moves on to step S154, and a check is made to determine whether all the keywords extracted by the extracting unit 58 have been selected. If the determination result herein is negative, the operation returns to step S138.

Next, a case where the converting unit 62 selects "Cool Blue Speaker 2" as a keyword in step S138 is described. In this case, the keyword is "Cool Blue Speaker 2", and the confidentiality level is "Medium". Therefore, the determination result of step S140 is negative, but the determination result of step S146 is positive. The operation then moves on to step S148.

In step S148, a subroutine to convert the keyword in accordance with the confidentiality is executed. Specifically, the operation of FIG. 10 is performed, as in step S142. In the operation of FIG. 10, in step S160, the converting unit 62 determines whether "Cool Blue Speaker 2" contains a specific conversion word. Since the determination result herein is negative, the operation moves on to step S166, and a conversion subroutine is executed. In the conversion subroutine of step S166, the operation of FIG. 12 is performed, as in steps S164 and 180. In FIG. 12, "Cool Blue Speaker 2" is neither the name of a place nor the name of a person. Therefore, the determination results of steps S190 and S194 are negative, and the converting unit 62 performs an initial conversion in step S198. In this case, in the keyword DB, "Cool Blue Speaker 2 (in English)" written next to "Cool Blue Speaker 2 (in Japanese)" is subjected to an initial conversion (an initial conversion on the capital letters), and is converted into "CBS2".

After the operation of FIG. 12 is completed as described above, the operation moves on to step S168 of FIG. 10. However, in the keyword DB of FIG. 7, "Cool Blue Speaker 2" is not accompanied by any information. Therefore, the determination result of step S168 is negative, and the operation moves on to step S150 of FIG. 9. In step S150, the converted keyword is stored into the region B in the flash memory 64 shown in FIG. 14. That is, the converting unit 62 stores the keyword as it is into the region O, and stores "CBS2" into the region B corresponding to the keyword. After the storing operation is completed, the operation moves on to step S154, and a check is made to determine whether all the keywords extracted by the extracting unit 58 have already been selected. If the determination result herein is negative, the operation again returns to step S138.

Next, a case where the converting unit 62 selects "Ichiro Aoyama" as a keyword in step S138 is described. In this case, the confidentiality level of "Ichiro Aoyama" is "High". Therefore, the determination result of step S140 is positive, and the operation then moves on to step S142.

In step S142, the operation of FIG. 10 is performed in the same manner as described above. In the operation of FIG. 10, the determination result of step S160 is negative, and the operation moves on to step S166 (the operation of FIG. 12). In step S190 of FIG. 12, the determination result is negative, and the operation moves on to step S194. In step S194, the converting unit 62 determines whether "Ichiro Aoyama" is a person's name. If the determination result herein is positive, the operation moves on to step S196. It should be noted that, "Ichiro Aoyama" is determined to be a person's name in step S194, because the attribute of "Ichiro Aoyama" is the name of a person of a client company in the keyword DB of FIG. 7.

In step S196, the converting unit 62 performs an initial conversion on "Ichiro Aoyama". If the confidentiality level of the keyword is "High", both the first name and the family name are subjected to the initial conversion in step S196. That is, "Ichiro Aoyama" is converted into "I. A". In a case where the confidentially level of a keyword such as "Saburo Ueda" registered in the keyword DB of FIG. 7 is "Medium", for example, only the first name is subjected to the initial conversion. That is, "Saburo Ueda" is converted into "S. Ueda". Alternatively, only the family name may be subjected to the initial conversion, and "Saburo Ueda" may be converted into "Saburo U".

After the procedure of step S196 is completed, the operation moves on to step S168 of FIG. 10. Here, the keyword "Ichiro Aoyama" is accompanied by the information "Dai-Tokyo Kabushiki Kaisha; Camera, AF Motor; Tokkyo Workshop (Tokyo), Oct. 15, 2009", as shown in FIG. 7. Therefore, the determination result of step S168 is positive, and the operation moves on to step S170. In step S170, the information "Dai-Tokyo Kabushiki Kaisha" is selected, for example. Since the confidentiality level of "Dai-Tokyo Kabushiki Kaisha" is "High" as described above, the determination result of step S172 is positive, and the operation moves on to step S174. Since "Dai-Tokyo Kabushiki Kaisha" contains the specific conversion word "Kabushiki Kaisha", the determination result of step S174 is positive. The specific conversion word is then converted (step S176), and the words other than the specific conversion word are converted (step S178). It should be noted that steps S176 and S178 are the same as the above described steps S162 and S164. If the determination result of step S182 is negative, the operation returns to step S170.

After that, steps S170 through S182 are repeated until all the information has been selected. After all the information has been selected, the converted keyword is associated with the converted information in step S184. Here, "I. A. (Camera, AFM; T Workshop (Tokyo), Oct. 15, 2009)" is generated. When the storing into the region A is completed in step S144 of FIG. 9, the operation moves on to step S154, and a check is made to determine whether all the keywords extracted by the extracting unit 58 have already been selected. If the determination result herein is negative, the operation again returns to step S138.

If the determination result of step S146 of FIG. 9 is negative in the above described operation, or if the confidentiality level of a keyword is "Low", the keyword is stored as it is into the region C (and the region O) in step S152. It should be noted that, if the keyword is accompanied by information, the information is also stored into the region C. For example, where the keyword is "SVS Company", "SVS Company; Machinery; Munich, Germany" is stored into the region C, as shown in FIG. 14.

In a case where the keyword selected in step S138 is "Software" in the above described operation, for example, "Software" is subjected to an initial conversion and is converted into "SW". Also, the information <Sponge> shown in FIG. 7 is not converted, and is associated with "SW". In this case, the expression <xx> represents a word that is handled on the equal terms with the keyword. That is, either "Software" or "Sponge" is used. Therefore, in a case where the above described operation is performed on the keyword "Software", "SW" and "Sponge" are equally stored into the region B in the flash memory 64. The distinction in use between "SW" and "Sponge" will be described later.

The above described operation is performed on the other keyword(s) ("Specification" in this case). If the determination result of step S154 becomes positive, the operation moves on to step S124 of FIG. 8.

In step S124, the server-side control unit 70 obtains the weight related to the attribute of the speaker. In this case, a weight (Tw) is obtained from the position of the speaker in the office, based on the attribute-related weight table shown in FIG. 15A. For example, if the speaker is Saburo Ueda shown in FIG. 7, "2" for a manager (M) is obtained as the weight (Tw).

Next, in step S126, the server-side control unit 70 obtains a weight related to the audio volume level. In this case, the server-side control unit 70 obtains a weight (Vw), based on the volume-level-related weight table shown in FIG. 15B and the audio volume level stored in the storage data DB (see FIG. 5). In a case where the audio volume level is 70 db as in FIG. 5, the weight (Vw) is "3". As the audio volume level becomes higher, the weight (Vw) becomes greater. This is because, when the audio volume level is high, there is a high possibility that the speaker is appealing strongly, and the degree of importance of the speech is high.

Next, in step S128 of FIG. 8, the server-side control unit 70 obtains a weight related to the keyword. In this case, the server-side control unit 70 obtains a weight (Kw), based on the keyword-related weight table shown in FIG. 15C and the keyword contained in the text data in the storage data DB. In FIG. 15C, "important", "significant", "very important", and "quite significant" are registered. Therefore, if any of those keywords is contained in the text data, "2" or "3" is obtained as the weight (Kw). In step S128, the server-side control unit 70 also determines how many keywords with the confidentiality level "High" are contained in the text data, and how many keywords with the confidentiality level "Medium" are contained in the text data. Based on the determination results and the keyword-confidentiality-related weight table shown in FIG. 15D, the server-side control unit 70 obtains a weight (Cw) related to the confidentiality of the text data. In a case where two keywords with the confidentiality level "High" and one keyword with the confidentiality level "Medium" are contained in the text data, for example, the server-side control unit 70 obtains "Cw=8" (=3×2+2×1).

After the procedure of step S128 of FIG. 8 is completed, the operation moves on to step S86 of FIG. 4. In step S86, the server-side control unit 70 calculates and registers a task priority (Tp) in the storage data DB (FIG. 5). Specifically, the server-side control unit 70 calculates the task priority (Tp), using the following mathematical formula (I):

$$Tp = Uvw \times Vw + Utw \times Tw + Ufw \times Fw + Ukw \times Kw + Ucw \times Cw \quad (1)$$

It should be noted that Uvw, Utw, Ufw, Ukw, and Ucw are weighting coefficients generated by taking into account the degrees of importance of the respective weights (Vw, Tw, Fw, Kw, and Cw). Those weighting coefficients can be set by the user or the like via the setting unit 74.

Next, the operation moves on to step S88 of FIG. 4, and the server-side control unit 70 registers the keywords contained in the text data in the keyword recording DB shown in FIG. 16. The keyword recording DB of FIG. 16 is created on a weekly, monthly, or annual basis, for example. In the keyword recording DB of FIG. 16, relevant information, such as keywords that are used at the same time as the keywords contained in text data (the registered keywords), the speakers who used the registered keywords, and the dates and places of the usage of the registered keywords, is recorded point by point. Also, the number of times each registered keyword is associated with the relevant information is recorded as the degree of association. Further, the number of times each recorded keyword is spoken is recorded as the frequency of appearance. The column of the frequencies of search in the keyword recording DB of FIG. 16 will be described later.

After the procedure of step S88 is completed, the operation returns to step S70.

(Where the Determination Result of Step S78 is Negative (where the Text Data does not Indicate a Task))

Figure 18A:
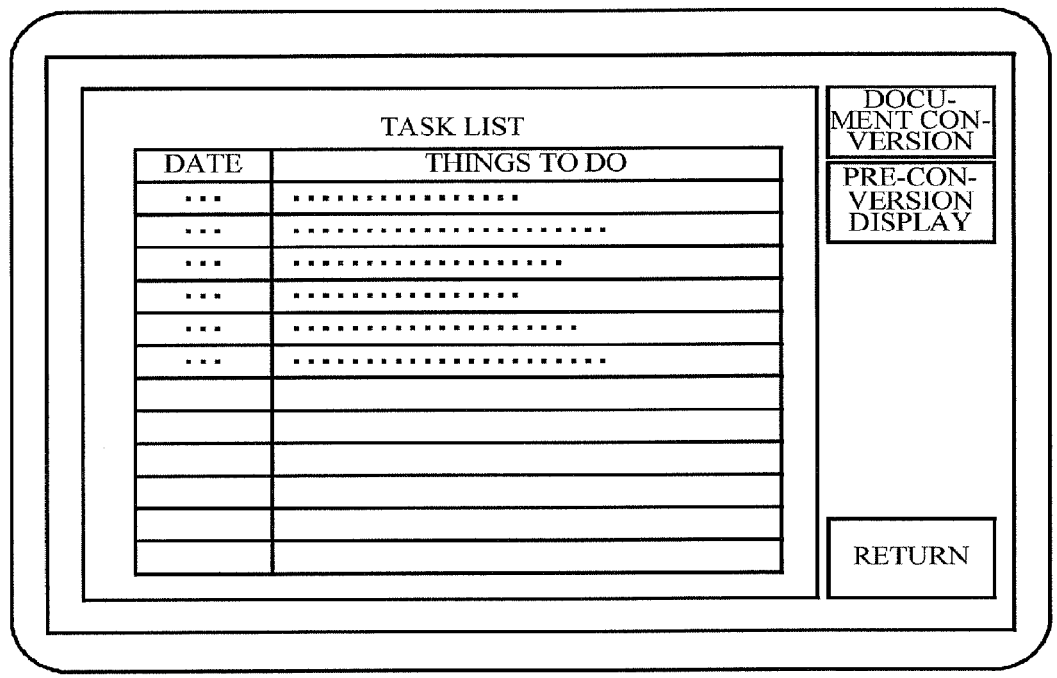
FIG. 18A is a diagram showing an example of a displayed task list.
Figure 18B:
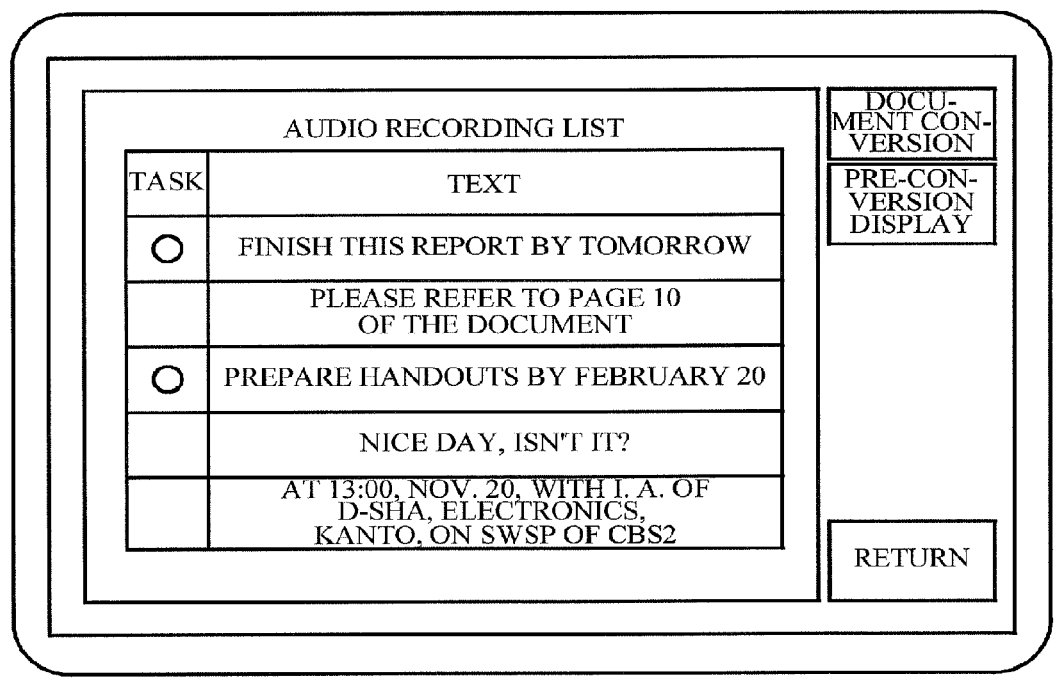
FIG. 18B is a diagram showing an example of a displayed audio recording list.

Next, a case where the determination result of step S78 is negative is described. If the determination result of step S78 is negative, the operation moves on to step S90, and the server-side control unit 70 sets the task flag to "off". Next, in step S92, the server-side control unit 70 determines whether the speaker is the user. If the determination result herein is positive, the operation moves on to step S94, and a check is made to determine whether the words spoken by the user form a command. For example, as shown in the command DB shown in FIG. 17, the words "task list" is the command to display the task list, the words "audio recording text" is the command to display the audio recording list, and the word "conversion" is the command to perform a converting operation. It should be noted that the command DB is stored in the flash memory 28 in the portable terminal 10 or the hard disk 66 in the server 50. The command DB defines that, when the voice of the user indicates "task list", the task list shown in FIG. 18A is displayed. This task list will be described later in detail. The command DB also defines that, when the voice of the user indicates "audio recording list", the audio recording list shown in FIG. 18B is displayed. This audio recording list will also be described later in detail.

Figure 20:
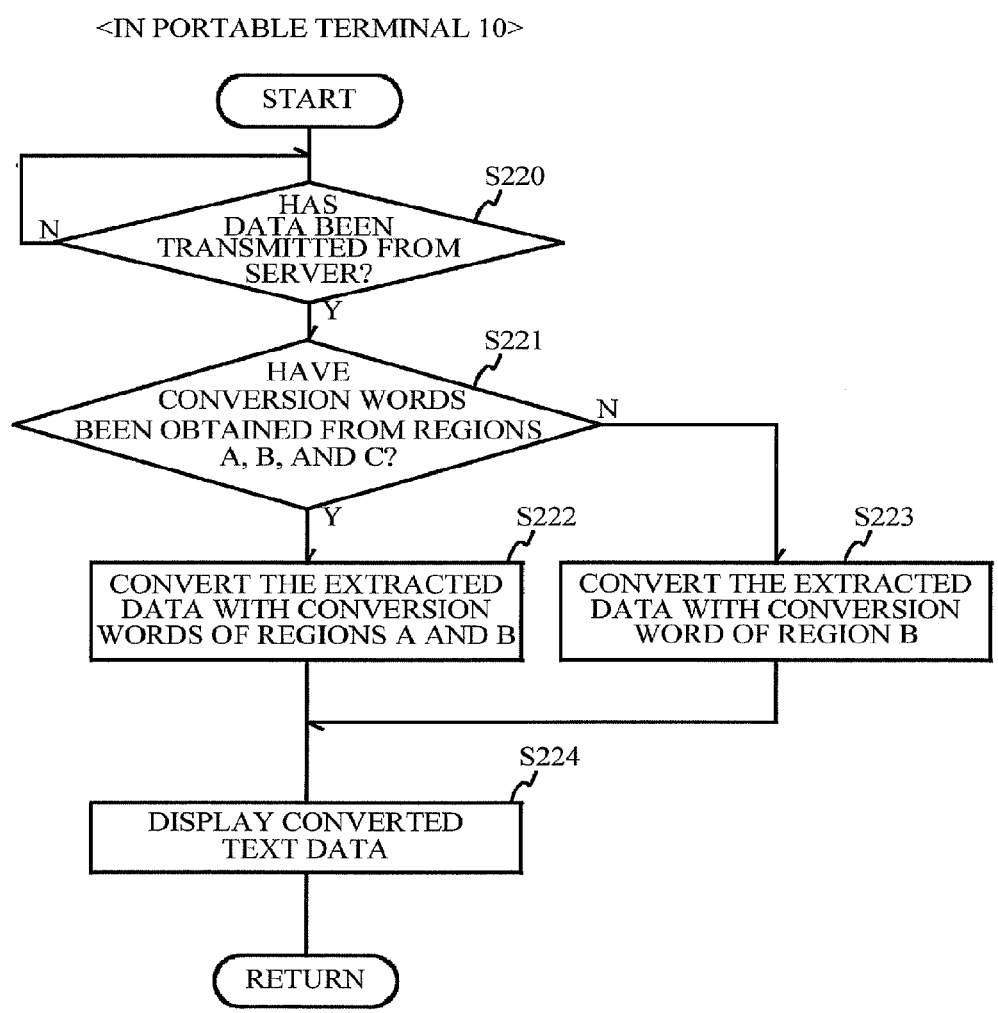
FIG. 20 is a flowchart showing an operation 2) to be performed concurrently in step S96.
Figure 21:
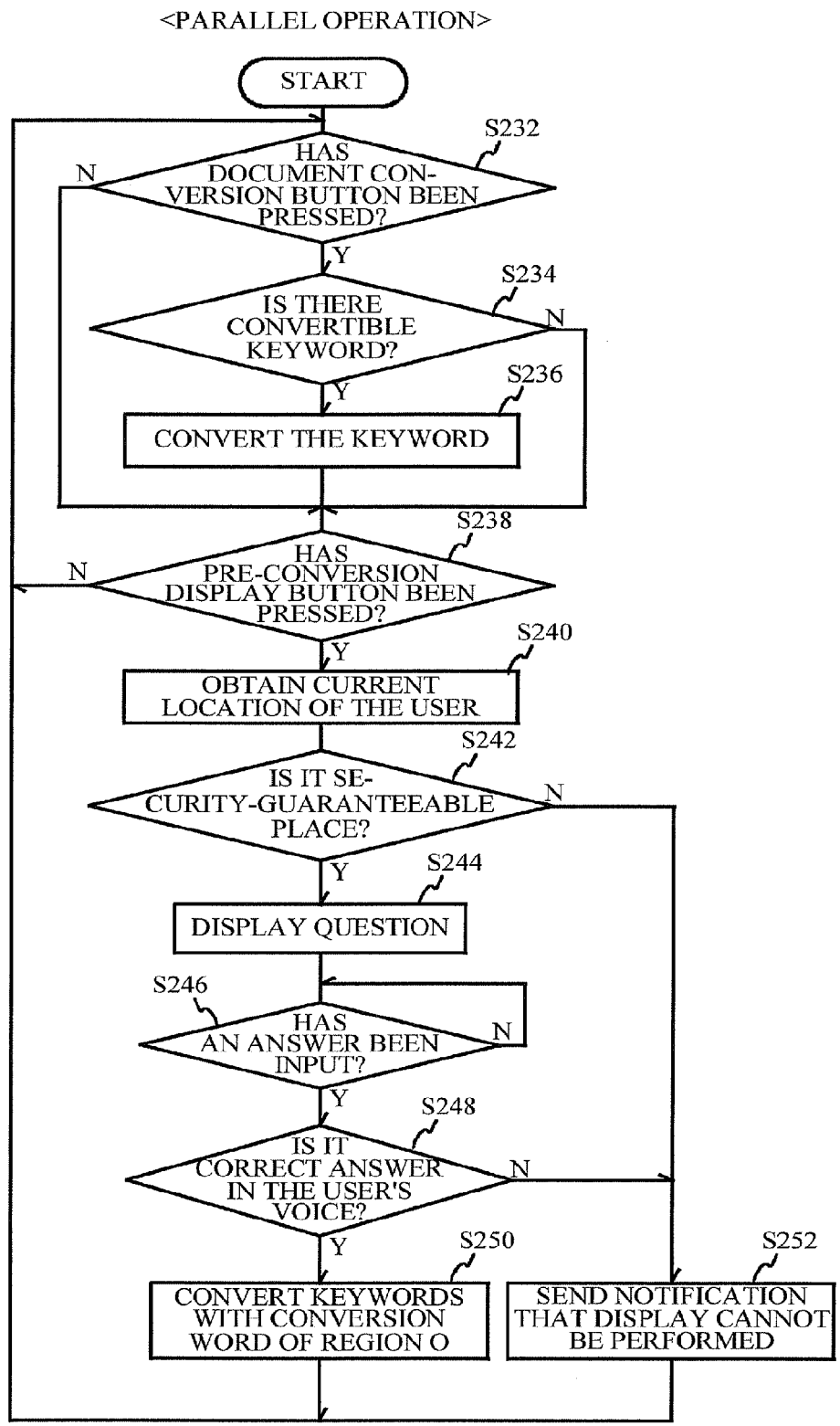
FIG. 21 is a flowchart showing an operation 3) to be performed concurrently in step S96.

Referring back to FIG. 4, if the determination result of step S94 is negative, the operation returns to step S70. If the determination result of step S94 is positive, the operation moves on to step S96, and the server-side control unit 70 executes a subroutine to perform an operation in accordance with the command. Specifically, the operations of FIGS. 19, 20, and 21 are performed in a simultaneous and parallel manner.

Figure 19:
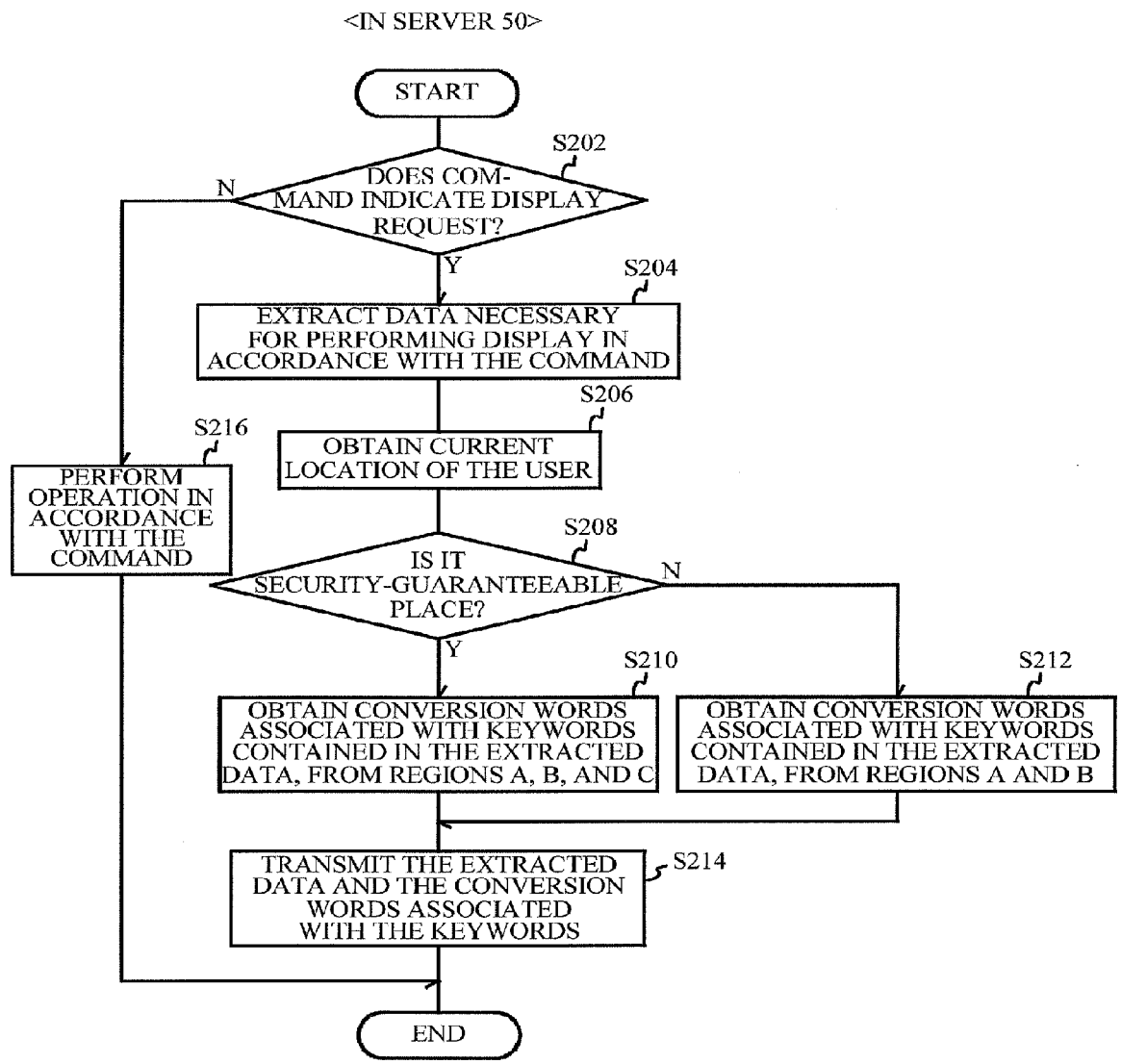
FIG. 19 is a flowchart showing an operation 1) to be performed concurrently in step S96.

Referring first to the flowchart of FIG. 19, an operation to be performed in the server 50 is described. In the server 50, the server-side control unit 70 determines whether the command is a display request in step S202. In this case, a command such as "task list" or "audio recording list" is equivalent to a display request, as described above.

Next, in step S204, the server-side control unit 70 extracts the data necessary for the display in accordance with the command, from the flash memory 64. For example, if the command is "task list", the text data to be displayed on the task list (the text data having the task flag set to "on" in FIG. 5) is extracted from the flash memory 64. It should be noted that the text data having the task flag set to "on" includes not only the text data converted from audio data but also text data input directly from the text data input unit 44. The task flag of the directly-input text data is set to "on" or "off" in the same manner as illustrated in FIG. 6.

Next, in step S206, the server-side control unit 70 obtains the current location of the user. In this case, the location information detected by the location detecting unit 22 in the portable terminal 10 is obtained via the terminal-side control unit 30 and the communication units 32 and 52.

Next, in step S208, based on the obtained location information (the current location), the server-side control unit 70 determines whether the current location is a location where security can be guaranteed. Here, the location where security can be guaranteed may be in the office, for example. The location of the office is registered in the following manner.

For example, the user connects the portable terminal 10 to a PC (Personal Computer), and activates a special-purpose application using map information in the PC. By designating the street address of the office with the application, the location of the office is registered. The street address is designated by a drawing operation using a mouse or the like. The location of the office is expressed as a region having a predetermined area. Therefore, the location of the office can be expressed by diagonal two points (latitude and longitude) of a rectangular region, as shown in the security-guaranteeable range DB shown in FIG. 22. The security-guaranteeable range DB of FIG. 22 is stored in the hard disk 66 in the server-side control unit 70.

That is, in step S208, the server-side control unit 70 refers to the security-guaranteeable range DB of FIG. 22. If the user is located in the range, the user is determined to be in a security-guaranteeable place.

If the determination result of step S208 is positive, the operation moves on to step S210. In step S210, the server-side control unit 70 obtains the conversion words associated with the keywords contained in the extracted data from the regions O, A, B, and C, and the operation moves on to step S214. If the determination result of step S208 is negative, on the other hand, the operation moves on to step S212. In step S212, the server-side control unit 70 obtains the conversion words associated with the keywords contained in the extracted data from the regions A and B, and the operation moves on to step S214.

In step S214, the server-side control unit 214 transmits the extracted data and the conversion words associated with the keywords to the portable terminal 10 via the communication unit 52.

If the determination result of step S202 is negative, or if the command is not a display request, the server-side control unit 70 performs an operation in accordance with the command in step S216.

Referring now to FIG. 20, an operation to be performed in the portable terminal 10 is described. In step S220 of FIG. 20, the terminal-side control unit 30 determines whether data has been transmitted from the server side. In this step, the determination result becomes positive after step S214 of FIG. 19 is carried out.

Next, in step S221, the terminal-side control unit 30 determines whether conversion words of the regions A, B, and C have been transmitted. Here, the determination result is positive in a case where step S210 of FIG. 19 has been carried out, and the determination result is negative in a case where step S212 has been carried out.

If the determination result of step S221 is positive, the terminal-side control unit 30 converts the keywords contained in the extracted data with the conversion words of the regions A, B, and C in step S222. Specifically, the extracted words may be "Meeting with Mr. Ichiro Aoyama of Dai-Tokyo Kabushiki Kaisha, on the Software Specification of Cool Blue Speaker 2, at 13:00, November 20", for example. In that case, with the use of the conversion words of the regions A, B, and C, the extracted words are converted into "Meeting with Mr. I. A. (Camera, AFM; T Workshop (Tokyo), Oct. 15, 2009) of D-Sha (Electronics; South Kanto), on SWSP of CBS2, at 13:00, November 20".

If the determination result of step S221 is negative, on the other hand, the terminal-side control unit 30 converts the extracted data with the conversion words of the region B, and deletes the words of the region A in step S223. In this case, the extracted data is converted into "Meeting with Mr. X of X, on SWSP of CBS2, at 13:00, November 20". As described above, in this embodiment, the data display manner is changed, depending on whether security is guaranteed.

After the procedure of step S222 or step S223 is carried out in the above described manner, the operation moves on to step S224, and the terminal-side control unit 30 performs an operation to display the converted text data in a predetermined position on the display unit 14. In this display, the task to be carried out at the time (date) closest to the current time (date) may be displayed first in the order of date. In this embodiment, however, tasks are displayed in order of task priority. With this arrangement, the possibility that the user will miss an important task can be made lower, and the task with the higher priority can be preferentially scheduled even if there is double booking. If there is double booking, the terminal-side control unit 30 may issue a warning via the warning unit 18. If a person related to the plan with the lower priority is included in a task, the terminal-side control unit 30 may automatically send the person a request to change the date of the task via e-mail. However, tasks are not necessarily displayed in order of task priority as described above, and may of course be displayed in the order of date. Also, tasks may be displayed in the order of date, and the tasks with high task priorities may be displayed in a conspicuous font, color, or size. Also, tasks may be displayed in order of task priority, and tasks with the same task priority may be displayed in the order of date.

As described above, through the operations of FIGS. 19 and 20, the screens shown in FIGS. 18A and 18B are displayed. In the audio recording list of FIG. 18B, the boxes of tasks are provided. By touching the box of a subject task on the touch panel, the user can set the task flag to "on" or "off". In this case, when recognizing a task flag switching operation performed by the user, the server-side control unit 70 changes the task flag of FIG. 5. In this manner, even if the status of the task flag differs from the status recognized by the user as a result of the operation of FIG. 6, the user can manually change the task flag. It should be noted, when the user sets the task flag to "on", the server-side control unit 70 may automatically set the task flag to "on" for text data similar to the text data about the subject task.

In the operation of FIG. 20, the terminal-side control unit 30 transmits the current location obtained by the location detecting unit 22 to the server-side control unit 70, and converts the text data with the use of the conversion words transmitted from the server-side control unit 70. The converted text data is displayed. Therefore, it can be said that, in this embodiment, the terminal-side control unit 30 restricts display on the display unit 14 in accordance with the current location obtained by the location detecting unit 22.

Referring now to FIG. 21, an operation to be performed in parallel with the operation of FIG. 20 is described. In step S232 of FIG. 21, the terminal-side control unit 30 determines whether the user has pressed a document conversion button. The document conversion button is the button shown at the upper right corner of each of FIGS. 18A and 18B. The user presses the document conversion button by operating the touch panel or keyboard or the like. If the determination result of step S232 is positive, the operation moves on to step S234. If the determination result is negative, the operation moves on to step S238.

In step S234, the terminal-side control unit 30 determines whether a convertible keyword is displayed. Here, a convertible keyword is a keyword associated with two or more conversion words, such as "SW" and "Sponge" shown in FIG. 14 described above. Therefore, if the text data displayed on the display unit 14 contains such a keyword, the determination result herein is positive, and the operation moves on to step S236. If the determination result of step S234 is negative, on the other hand, the operation moves on to step S238.

If the operation moves on to step S236, the terminal-side control unit 30 converts the keyword. Specifically, if the displayed text is "Meeting with Mr. I. A. (Camera, AFM; T Workshop (Tokyo), Oct. 15, 2009) of D-Sha (Electronics; South Kanto), on SWSP of CBS2, at 13:00, November 20", for example, "SW" can be converted into "Sponge". Therefore, the terminal-side control unit 30 converts the text into "Meeting with Mr. I. A. (Camera, AFM; T Workshop (Tokyo), Oct. 15, 2009) of D-Sha (Electronics; South Kanto), on Sponge SP of CBS2, at 13:00, November 20".

Even if the user cannot think of "Software" from "SW", the user sees the display of "Sponge" after pressing the document conversion button, and can think of "Software" by associating "Sponge" with "soft" and then associating "soft" with "Software". If the user sees the word "Sponge" for the first time, the user might not be able to make such mental associations. However, the mental associations of "Software" can be made easier by notifying all the workers in the company of the association method.

Next, in step S238, the terminal-side control unit 30 determines whether a pre-conversion display button (see FIGS. 18A and 18B). When the user presses the pre-conversion display button, the user wishes to see the text with unconverted keywords. If the determination result herein is negative, the operation returns to step S232. If the determination result herein is positive, the operation moves on to step S240. In step S240, the terminal-side control unit 30 obtains the current location of the user. In step S242, the terminal-side control unit 30 determines whether the current location is a security-guaranteeable place. If the determination result herein is negative, or if the user is located in a place where security cannot be guaranteed, it is necessary to restrain the user from seeing the unconverted text. Therefore, in step S252, the user is notified that the unconverted text cannot be displayed, and the operation returns to step S232. In the notification in step S252, display on the display unit 14 or a warning via the warning unit 18 can be used, for example.

If the determination result of step S242 is positive, the operation moves on to step S244, and the terminal-side control unit 30 displays a question (a question the user should be able to answer easily) on the display unit 14. The question is stored in the hard disk 66 in the server 50. The terminal-side control unit 30 reads the question from the hard disk 66, and displays the question on the display unit 14. The question and an example answer are registered beforehand by the user, for example.

Next, in step S246, the terminal-side control unit 30 determines whether the user has audibly input an answer to the input unit 12. If the determination result herein is positive, the terminal-side control unit 30 determines whether the voice belongs to the user and whether the answer is a correct answer in step S248. The user's voice is determined by using the result of the voice analysis carried out by the above described voiceprint analyzing unit 55 in the server 50. If the determination result herein is negative, the user is notified, in step S252, that the unconverted text cannot be displayed. If the determination result of step S248 is positive, on the other hand, the operation moves on to step S250, and the text is converted with the use of the conversion words of the region O into the text with unconverted keywords. Specifically, the text as it is input by voice, or "Meeting with Mr. Ichiro Aoyama of Dai-Tokyo Kabushiki Kaisha, on the Software Specification of Cool Blue Speaker 2, at 13:00, November 20", is displayed in the above described example. After that, the operation moves on to step S232, and the above described procedures are repeated. In the above described example, the user audibly answers a question. However, the present invention is not limited to that, and the user may input an answer through a keyboard. In that case, the terminal-side control unit 30 may determine whether the state before the conversions is to be displayed, based on the result of biometric authentication such as fingerprint authentication as well as the answer to the question.

After the procedures of step S96 of FIG. 4 are completed in the above described manner, the operation returns to step S70.

If the determination result of step S92 of FIG. 4 is negative, or if the person who has emitted the voice is not the user, the operation moves on to step S100, and the terminal-side control unit 30 displays the information about the person who has emitted the voice. Here, the terminal-side control unit 30 performs display based on information received from the server-side control unit 70. Specifically, if the person who has emitted the voice is Ichiro Aoyama, the terminal-side control unit 30 receives the information from the server-side control unit 70, and displays "Ichiro Aoyama". If information accompanying Ichiro Aoyama is received, the information may also be displayed. If a task related to Ichiro Aoyama is received from the server-side control unit 70, the task may also be displayed.

With this arrangement, when Mr. Ichiro Aoyama says "Gook morning." to the user, for example, the name, the relevant information, the task, and the like can be displayed on the display unit 14. In this manner, it is possible to aid the user to remember the name of a person and information about the person, or the task to do in relation to the person.

Next, in step S102, the server-side control unit 70 determines whether a word registered in the ambiguous word DB shown in FIG. 23. If the determination result herein is negative, the operation returns to step S70. If the determination result is positive, the operation moves on to step S104.

In step S104, the server-side control unit 70 and the terminal-side control unit 30 carries out operations in accordance with the spoken word, based on the ambiguous word DB of FIG. 23. Specifically, in a case where "that" or "that matter" is spoken, the server-side control unit 70 refers to the keyword recording DB, to extract a keyword with a higher appearance frequency than a predetermined threshold value from the keywords contained in the relevant information about the person who has spoken the word. The server-side control unit 70 transmits the extracted keyword to the terminal-side control unit 30. The terminal-side control unit 30 displays the received keyword on the display unit 14. For example, in a case where the person who has spoken the word is Mr. Yamaguchi, a manager, and the appearance frequency threshold value is 10, the keyword "Project A" in the keyword recording DB of FIG. 16 is displayed on the display unit 14. Also, in a case where "that matter related to (the name of a place)" such as "that manner related to Hokkaido" is spoken, for example, the server-side control unit 70 extracts a keyword such that the person who has spoken the words is included in the relevant information and that the location (latitude and longitude) where the audio data has been input is in a predetermined region (in Hokkaido, for example), or a keyword such that the person who has spoken the words is included in the relevant information and that the word "Hokkaido" is included in the relevant information. The keyword is then displayed on the display unit 14. Further, in a case where "that matter on "MM/DD"" is spoken, for example, the server-side control unit 70 extracts a keyword such that the person who has spoken the words is included in the relevant information and that the date on which the audio data has been input matches "MM/DD", or a keyword such that the person who has spoken the words is included in the relevant information and that the words "MM/DD" are included in the relevant information. The keyword is then displayed on the display unit 14. Further, there might be a case where it is easy to predict when a certain person will speak, based on the keyword recording DB of FIG. 16. In such a case, a relevant keyword may be displayed in accordance with the person who has spoken and the current time.

In step S104, by performing the above described operation, an ambiguous question asked by a speaker can be automatically determined, and the determination result can be displayed to the user. It should be noted that, in step S104, every time a keyword is displayed, the server-side control unit 70 updates the search frequencies in the keyword recording DB. The search frequency can be used in a case where keywords with high search frequencies are preferentially displayed, for example.

Figure 24:
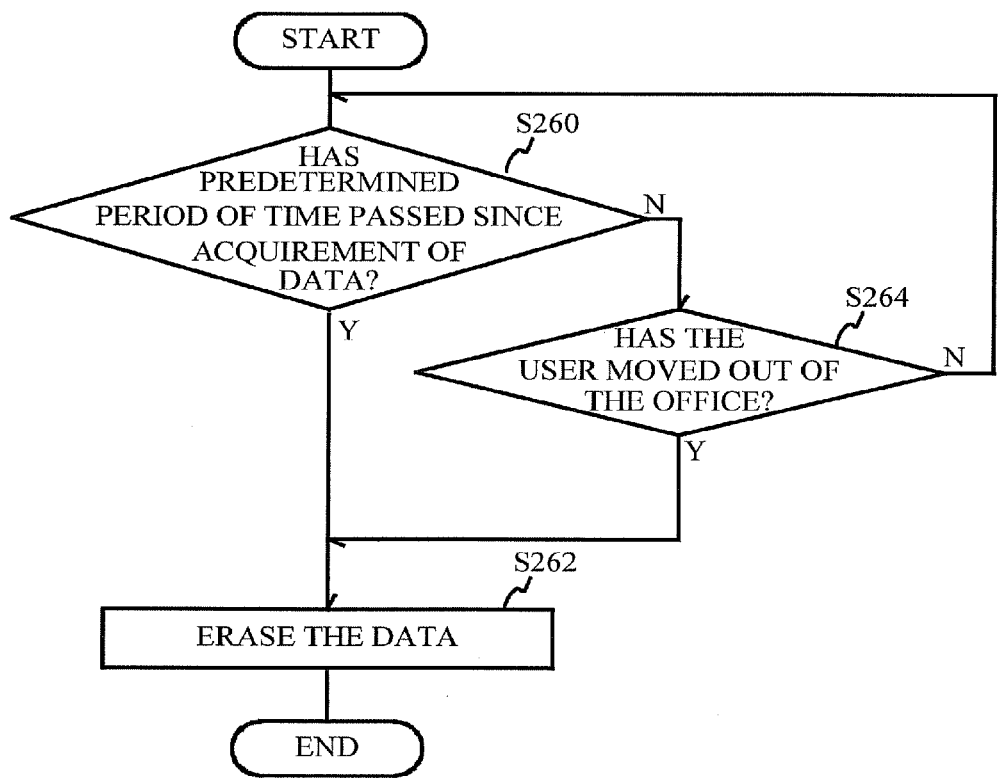
FIG. 24 is a flowchart showing a data erasing operation to be performed in the portable terminal.
Figure 25:
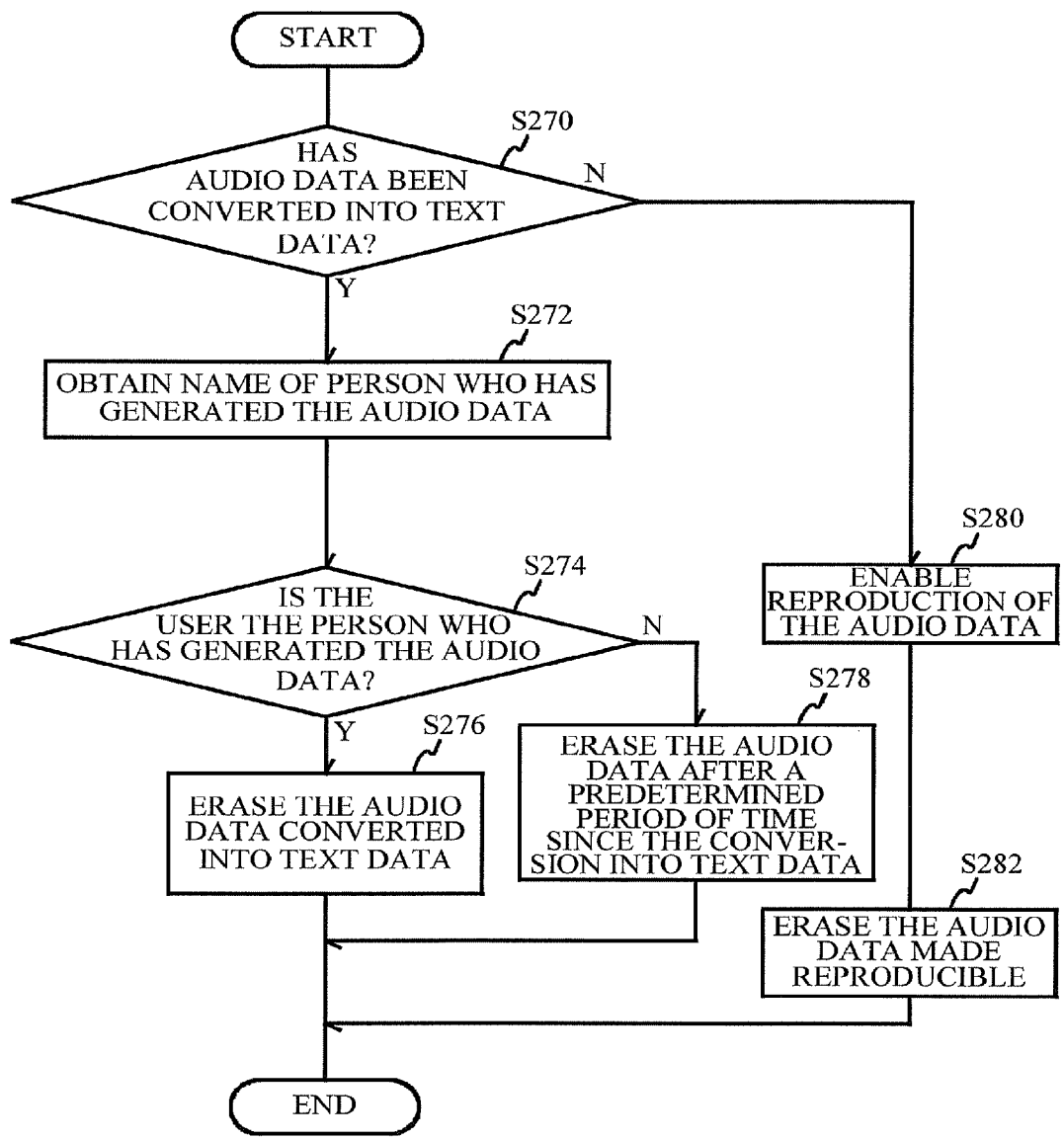
FIG. 25 is a flowchart showing an audio data erasing operation to be performed in the server.

Referring now to FIGS. 24 and 25, operations to be performed to erase data obtained by the portable terminal 10 and the server 50 are described.

(Data Erasing Operation (1: To Erase Converted Data))

FIG. 24 is a flowchart showing an operation to be performed to erase information the portable terminal 10 has obtained from the server 50. As shown in FIG. 24, in step S260, the terminal-side control unit 30 determines whether a predetermined period of time (2 to 3 hours, for example) has passed since the data acquirement. If the determination result herein is positive, the operation moves on to step S262, and the terminal-side control unit 30 erases the text data (including unconverted words and converted words) stored in the flash memory 28. If the determination result of step S260 is negative, on the other hand, the operation moves on to step S264, and the terminal-side control unit 30 determines whether the user has moved out of the office. If the determination result herein is positive, the operation moves on to step S262, and data is erased in the same manner as above. If the determination result of step S264 is negative, the operation returns to step S260. In this manner, when a predetermined period of time has passed since the acquirement of data, or when security cannot be guaranteed, the outflow of important data or the like can be prevented. In the above described example, all the text data is erased. However, the present invention is not limited to that, and only the data of the highest importance may be erased in step S262. For example, only the data in the region A and the data in the region O may be erased.

In the operation of FIG. 24, when the user (the portable terminal 10) is located outside the office in the first place, converted data may be erased from the flash memory 28 immediately after the converted data is displayed on the display unit 14.

(Data Erasing Operation (2: To Erase Audio Data))

The server-side control unit 70 performs the erasing operation of FIG. 25 on each piece of audio data. In step S270 of FIG. 25, the server-side control unit 70 determines whether the text data generating unit 54 has converted (or has managed to convert) audio data into text data. If the determination result herein is negative, the operation moves on to step S280. If the determination result herein is positive, the operation moves on to step S272, and the server-side control unit 70 obtains the name of the person who has emitted the audio data. Here, the server-side control unit 70 obtains the name of the person who has emitted the voice from the voiceprint analyzing unit 55, and the operation moves on to step S274.

In step S274, the server-side control unit 70 determines whether the person who has emitted the voice is a person other than the user. If the determination result herein is positive, the operation moves on to step S276, and the server-side control unit 70 erases the audio data converted into text data. If the determination result herein is negative, or if the audio data belongs to the user, the operation moves on to step S278, and the audio data is erased after a predetermined period of time has passed. The entire operation of FIG. 25 then comes to an end.

When the operation moves on to step S280 after the determination result of step S270 becomes negative, the server-side control unit 70 makes the audio data reproducible. Specifically, the server-side control unit 70 transmits the audio data to the flash memory 28 in the portable terminal 10. In step S280, the user is warned, via the warning unit 18, that the audio data has failed to be converted into text data. Based on this warning, the user inputs an instruction to reproduce the audio data from the input unit 12 of the portable terminal 10. In that case, the user reproduces the audio data stored in the flash memory 28 via the reproducing unit 16.

Next, in step S282, the server-side control unit 70 erases the audio data transmitted to the flash memory 28 (or the audio data reproduced at the reproducing unit 16), and the entire operation of FIG. 25 comes to an end.

By performing the operation to erase audio data in the above described manner, the amount of audio data stored in the server 50 can be reduced. Accordingly, the storage capacity of the flash memory 64 in the server 50 can be made smaller. Also, audio data emitted from a person other than the user is erased immediately after the conversion into text data, so that the privacy of the person can be protected.

(Data Erasing Operation (3: To Erase Task))

The server-side control unit 70 erases a task in accordance with the following rules.

1) Where the task is related to a conference to be held outside the company

In this case, the task is erased, when the current location detected by the location detecting unit 22 matches the venue for the conference specified in the task, and the current time detected by the time detecting unit 24 is past the conference start time that is set in the task. In a case where the current location does not match the venue for the conference though the current time is past the conference start time, the server-side control unit 70 issues a warning to the user from the warning unit 18 via the terminal-side control unit 30. In this manner, the user can be prevented from forgetting to perform the task. The present invention is not limited to that, and the server-side control unit 70 may issue a warning a predetermined period of time (30 minutes, for example) before the start of the task. In this manner, the user can be prevented from forgetting to perform the task.

2) where the Task is Related to a Conference within the Company

In this case, a location detecting unit that is capable of detecting a person entering a conference room, such as a RFID, is used as the location detecting unit 22. When the current location detected by the location detecting unit 22 matches the conference room specified in the task, and the current time detected by the time detecting unit 24 is past the conference start time set in the task, the task is erased. In this case, a warning can also be issued as described above in 1).

3) where the Task is Related to Shopping, and the Place to Shop is Specified

In this case, the task is erased, when the current location detected by the location detecting unit 22 matches the place specified in the task, and a voice saying "Thank you" or the like is input from the audio input unit 42 or purchase information is input to the input unit 12 from a POS register by wireless. In a case where the portable terminal has an electronic money function, for example, the task may be erased after payment is made by the function, instead of after an input from a POS register.

4) where Time is Specified in the Task, and Other Cases

In this case, the task is erased, when the current time detected by the time detecting unit 24 is past the task performance time set in the task.

As described above, this embodiment includes: the communication unit 52 to which information is input; the extracting unit 58 that extracts predetermined keywords from the data input to the communication unit 52; the classifying unit 60 that classifies the keywords extracted by the extracting unit 58 into keywords with the confidentiality level "High" and keywords with the confidentiality level "Medium"; and the converting unit 62 that converts the keywords with the confidentiality level "High" by a predetermined conversion method, and converts the keywords with the confidentiality level "Medium" by a different conversion method from the method for the keywords with the confidentiality level "High". By classifying keywords in accordance with the confidentiality levels and performing different conversions in accordance with the respective levels in the above described manner, data can be displayed, with the confidentiality levels being taken into account. Accordingly, user friendliness can be increased.

In this embodiment, the communication unit 52 communicating with the portable terminal 10 transmits the result of each conversion performed by the converting unit 62, to the portable terminal 10. Accordingly, even though data processing is not performed in the portable terminal 10, data can be displayed, with the confidentiality levels being taken into account.

This embodiment also includes the text data generating unit 54 that generates text data from audio data. The extracting unit extracts keywords from the text data generated by the text data generating unit 54. Accordingly, keyword extraction can be readily performed.

Also, in this embodiment, keywords are converted into initials. Accordingly, each keyword can be readily converted, without conversion tables specially designed for the respective keywords. In a case where a keyword is a person's name, both the first name and the family name are converted into initials if the confidentiality level is "High", and either the first name or the family name is converted into an initial if the confidentiality level is "Medium". Accordingly, display can be performed in accordance with the confidentiality levels. Further, in a case where a keyword is the name of a place, the keyword is converted into information about a predetermined zone (location information about a wide region) if the confidentiality level is "High", and the keyword is converted into information about a smaller zone than the predetermined zone (location information about a narrow region) if the confidentiality level is "Medium". In view of this, display can be performed in accordance with the confidentiality levels.

This embodiment also includes: the location detecting unit 22 that detects location information; the input unit 12 that performs an input; the display unit 14 that displays information related to the input; and the terminal-side control unit 30 that restricts display on the display unit 14 in accordance with the location detected by the location detecting unit 22. By restricting display in accordance with locations in the above described manner, display can be performed, with security being taken into account. Eventually, user friendliness can be increased.

Also, in this embodiment, when the terminal-side control unit 30 determines that security is not guaranteed based on the output from the location detecting unit 22, the terminal-side control unit 30 restricts display on the display unit 14. Accordingly, display can be restricted, with security being appropriately taken into account. Also, in this embodiment, when the terminal-side control unit 30 determines that security is guaranteed based on the output from the location detecting unit 22, the terminal-side control unit 30 at least partially lifts the restriction on display on the display unit 14. In view of this, display can also be restricted, with security being appropriately taken into account.

Also, the personal assistant system 100 of this embodiment includes: the portable terminal 10 that restricts display, taking security into account as described above; and the server 50 that puts a display restriction on at least part of data that is input from the portable terminal 10. Accordingly, data with a display restriction put thereon can be displayed on the display unit of the portable terminal 10, even though the portable terminal 10 has not put a display restriction on any part of the data. In this manner, the processing load on the portable terminal 10 can be reduced. As a result, the portable terminal 10 can be simplified, and can be made smaller and lighter.

This embodiment also includes: the display unit 14 that displays text data; the audio input unit 42 to which a voice is input; and the terminal-side control unit 30 that displays information related to the voice on the display unit, in accordance with the result of an audio analysis. Accordingly, when a person emits a voice saying "Good morning", information about the person (such as the name, registered information other than the name, or a task to be performed for the person) can be displayed on the display unit 14 as in step S100 of FIG. 4. With this arrangement, the user can look at the display unit 14 to remember the person who has emitted the voice, even if the user has forgotten the person. In this manner, this embodiment can provide the user-friendly personal assistant system 100 and the user-friendly portable terminal 10. In this case, appropriate display can be performed by using the result of an analysis carried out by the voiceprint analyzing unit 55 that analyzes voiceprints.

Also, in this embodiment, the terminal-side control unit 30 and the server-side control unit 70 causes the display unit 14 to display information related to a predetermined phrase (such as "that matter" or "that matter related to Hokkaido") contained in audio data, in accordance with the result of an analysis carried out by the voiceprint analyzing unit 55. Accordingly, it is possible to remember the task by checking the display unit 14, even when an ambiguous question such as "that matter" or "that matter related to Hokkaido" is asked. In this aspect, this embodiment can provide the user-friendly personal assistant system 100 and the user-friendly portable terminal 10. Also, in this embodiment, information related to a predetermined phrase (such as "that matter related to Hokkaido") is selected in accordance with a frequency that is input together with a predetermined word (such as "Hokkaido") to the input unit, and the selected information is displayed on the display unit 14 (step S104 of FIG. 4). Accordingly, appropriate information display can be performed.

Also, in step S104 of FIG. 4, information in accordance with the location where audio data is input is displayed on the display unit 14. In this aspect, appropriate information display can also be performed.

Also, in step S104 of FIG. 4, information in accordance with the time at which audio data is input (information that is input within a predetermined period of time after the input of the audio data) is displayed on the display unit 14. In this aspect, appropriate information display can also be performed.

This embodiment also includes: the input unit 42 to which a voice is input; the text data generating unit 54 that generates text data, based on the audio data input to the input unit 42; the voiceprint analyzing unit 55 that analyzes the voiceprint data in the audio data input to the input unit 42; and the erasing unit 76 that erases the audio data after the text data generating unit 54 generates the text data in accordance with the result of the analysis carried out by the voiceprint analyzing unit 55. By erasing the audio data after the text data is generated in the above manner, the storage capacity required in the flash memory 64 can be made smaller. Also, in this embodiment, audio data is erased in accordance with the result of an analysis carried out by the voiceprint analyzing unit 55. Accordingly, by erasing audio data about a specific person, excellent user friendliness can be achieved, with privacy being taken into consideration.

This embodiment also includes: the communication unit 52 to which information is input; the extracting unit 58 that extracts predetermined keywords from the data input to the communication unit 52; the classifying unit 60 that classifies the keywords extracted by the extracting unit 58 into keywords with the confidentiality level "High" and keywords with the confidentiality level "Medium"; and the converting unit 62 that converts the keywords with the confidentiality level "High" by a predetermined conversion method, and converts the keywords with the confidentiality level "Medium" by a different conversion method from the method for the keywords with the confidentiality level "High". By classifying keywords in accordance with the confidentiality levels and performing different conversions in accordance with the respective levels in the above described manner, data can be displayed, with the confidentiality levels being taken into account.

Also, in this embodiment, the voiceprint analyzing unit 55 carries out an analysis to determine whether the voiceprint data in audio data is voiceprint data of a registered user. The erasing unit 76 erases voices that do not belong to the user. Accordingly, the storage capacity that can be set in the flash memory 64 can be effectively made smaller, and protection of privacy can be made stronger.

Also, in this embodiment, after an analysis, the erasing unit 76 awaits for different periods of time before erasing the voice of the user and before erasing voices of others (steps S276 and S278). As the voice of the user is also erased after a predetermined period of time, the storage capacity can be made even smaller.

Also, in this embodiment, if the text data generating unit 54 cannot generate text data from audio data, the warning unit 18 issues a warning. Accordingly, the user can recognize that text data cannot be generated from the audio data. Also, if the text data generating unit 54 cannot generate text data from audio data (if the result of step S270 is negative), the reproducing unit 16 reproduces the audio data in accordance with an instruction from the user. Through the reproduction of the audio data, the user can check the contents that cannot be converted into text data.

This embodiment also includes: the display unit 14 that performs display; the audio input unit 42 to which a voice is input; the weighting unit 56 that performs weighting based on at least one of the volume, frequency, and meaning of the input voice; and the control units 70 and 30 that change the form of a task to be displayed on the display unit, based on the voice input by the audio input unit 42 and the weighting performed by the weighting unit 56. With this arrangement, the form of a task to be displayed on the display unit 14 is changed, based on the method of inputting audio data and the weighting performed by the weighting unit 56 in accordance with the contents of the audio data. Accordingly, a display form in accordance with the weight (the degree of importance) of audio data can be realized. Thus, user friendliness can be increased.

Also, according to this embodiment, the weighting unit 56 identifies the person who has emitted voice, using at least the frequency of the audio data. The weighting unit 56 then performs weighting in accordance with the identified person (the position of the person in the office in this embodiment). Accordingly, appropriate weighting based on the importance of the audio data can be performed.

Also, according to this embodiment, the weighting unit 56 performs weighting in accordance with the confidentiality based on the meaning of audio data. In this aspect, appropriate weighting based on the importance of the audio data can also be performed.

Also, in this embodiment, if a voice input from the audio input unit 42 contains date information, a task can be displayed based on the date information. Accordingly, the functions of a conventional timetable can be satisfactorily achieved. Also, in this embodiment, a task is displayed, based on information related to the time detected by the time detecting unit 24 or the date information from the calendar unit 26. Accordingly, tasks to be performed can be displayed, with the first displayed task being the task closest to or furthest from the current time.

This embodiment also includes the text data generating unit 54 that converts a voice input from the audio input unit 42 into text data. Accordingly, the weighting unit 56 can perform weighing on the text data. Thus, weighting can be more easily performed than in a case where weighting is performed on audio data.

Also, in this embodiment, the display order, colors, display sizes, and display fonts are changed based on results of weighting. Accordingly, results of weighting can be expressed in various forms.

Also, in this embodiment, display forms on the display unit are changed in accordance with outputs from the location detecting unit 22 that detects locations. That is, if a task is determined to have been performed based on the current location, the task is not to be displayed (or is deleted). Accordingly, the storage capacity can be made smaller.

Further, in this embodiment, a check is made to determine whether data indicates a task, based on whether audio data contains a fixed word. With the use of the determination result, a check is made to determine whether to perform display on the display unit 14. Accordingly, a check can be automatically made to determine whether data indicates a task, and it is also possible to automatically determine whether to perform display on the display unit.

Also, in this embodiment, the setting unit 74 is provided in the server 50, so as to enable the user to set weights. Accordingly, the user can perform settings related to weighting to the user's liking.

This embodiment also includes: the audio input unit 42 to which a voice is input; the text data generating unit 54 that is capable of converting the input voice into text data; and the server-side control unit 70 starts the conversion by the text data generating unit 54, or starts audio recording and converting the voice into text data, when the audio input unit 42 inputs a specific frequency. Accordingly, when a person emits a voice and the voice at a specific frequency is input, audio recording and a conversion into text data are started based on the voice input (see FIG. 2A). In this manner, audio recording and a conversion into text data can be automatically started. Thus, user operations are simplified, and user friendliness can be increased.

Also, in this embodiment, when the audio input unit 42 inputs a telephone-related frequency, a conversion into text data can be started. Accordingly, when a telephone rings, the voice from the telephone is recorded, and a conversion into text data can be performed. In this manner, the telephone conversation can be recorded without missing any part of it, and can be converted into text data.

Also, in this embodiment, audio recording and a conversion into text data can be started at an appropriate time such as on the date of a conference, based on a task. In this aspect, user operations can also be simplified, and user friendliness can be increased. Audio recording and a conversion into text data can also be performed in accordance with the ending time of a conference, for example (see FIG. 2C). Accordingly, audio data obtained during a period of time with a high possibility that the most important matter is discussed in the conference can be automatically started, and a conversion of the recorded audio data into text data can also be automatically started.

Also, in this embodiment, audio recording and a conversion into text data can be started at an appropriate time, based on biometric information about the user (see FIG. 2D). In this aspect, user operations can also be simplified, and user friendliness can be increased.

Further, in this embodiment, audio recording and a conversion into text data can be started when the current time is a predetermined time (see FIG. 2D). In this aspect, user operations can also be simplified, and user friendliness can be increased.

Also, in this embodiment, conversions by the text data generating unit 54 can be prohibited in accordance with the result of detection by the location detecting unit 22. Accordingly, in a situation where audio recording will cause a problem, such as in a conference outside the company, audio recording can be automatically prohibited. Thus, user friendliness can be further increased.

In the above described embodiment, the confidentiality level is determined for each word. However, the present invention is not limited to that, and the classifying unit 60 may classify business-related words as words with a high confidentiality level, and classify words to be used in the user's private time as words with a low confidentiality level, for example.

In the above described embodiment, when the current location detected by the location detecting unit 22 of the portable terminal 10 is a location where security is not guaranteed, keywords are converted and displayed, or restrictions are put on display on the display unit 14. However, the present invention is not limited to that. For example, when the time detected by the time detecting unit 24 is a predetermined time (within office hours, for example), restrictions may be put on display on the display unit 14. With this arrangement, display can be performed, with security being taken into account as in the above described embodiment. If such control is performed, the current time may be obtained, instead of the current location of the user, in step S206 of FIG. 19. A check may be then made to determine whether the current time is a security-guaranteeable time, instead of whether the location is a security-guaranteeable place, in step S208.

In the above described embodiment, a check is made to determine whether audio data indicates a task, based on the existence of date information and the type of the ending of the audio data. However, the present invention is not limited to that, and a task determination may be made based on the intonation of the audio data, for example.

In the above described embodiment, words with the confidentiality level "High" and words with the confidentiality level "Medium" are converted into initials that represent broader concepts. However, the present invention is not limited to that. For example, words converted from respective words may be defined in the keyword DB. In this case, as a word converted from the keyword "Camera", "Precision Equipment" that represents a broader concept of camera or "Imaging Device" that represents a narrower concept than that can be defined. In this case, if the confidentiality level of "Camera" is "High", the keyword can be converted into "Precision Equipment". If the confidentiality level of "Camera" is "Medium", the keyword can be converted into "Imaging device". By converting words into broader concept words and medium concept words in accordance with confidentiality levels in the above manner, display can be performed, with security being taken into consideration. If money amount information such as a budget is registered in the keyword DB, the money amount information may be expressed by a digit number that represents a broader concept of the money amount information.

In the above described embodiment, voices are in Japanese. However, voices may be in another language such as English. In another language (such as English), a check may be made to determine whether data indicates a task, based on the existence of predetermined words or predetermined sentence structures.

In the above described embodiment, the flash memory 28 is installed in the portable terminal 10, to reduce the size and weight of the portable terminal 10. Together with or instead of this, a storage device such as a hard disk may be installed in the portable terminal 10.

In the above described embodiment, when the location of a company is set, the portable terminal 10 is connected to an external PC, and the setting is performed in the external PC. However, the present invention is not limited to that. For example, the location of the company may be registered beforehand in the hard disk 66 in the server 50, and the location of the company may be downloaded from the hard disk 66. Also, an application for setting the location of the company, for example, may be installed in the portable terminal 10, so that the location of the company can be set in the portable terminal 10.

In the above described embodiment, task priorities are calculated based on the mathematical formula (I). However, the present invention is not limited to that, and task priorities may be calculated by using some other mathematical formula. For example, respective weights may be added or used in multiplications. Task priorities are not necessarily calculated by using the mathematical formula (I). Instead, one of the weights may be selected, and task priorities may be determined in descending order of the selected weight. In this case, the user may be allowed to set which weight is to be used in determining the task priorities.

In the above described embodiment, between initials converted from a keyword (such as "SW" for software) and a word based on imagery ("Sponge" for software), the initials are displayed first. However, the present invention is not limited to that, and the word based on imagery may be displayed first. Alternatively, the initials and the word based on imagery may be displayed at the same time.

In the above described embodiment, when a voice of a person other than the user is input to the input unit 12, information such as the name of the person who has emitted the voice is displayed. However, the present invention is not limited to that, and an image related to the person who has emitted the voice, such as a photograph of the person's face, may be displayed. In this case, such images need to be stored in the hard disk 66 in the server 50, for example, and need to be registered in the column of information in the keyword DB.

In the above described embodiment, closeness to the user may be used as a weight. In this case, a person whose voice is relatively often input, or a person who often comes close to the user among the owners of portable terminals, or the like can be a person having a high degree of closeness.

It should be noted that the structures described in the above embodiment are merely examples. That is, at least one of the components of the server 50 described in the above embodiment may be provided in the portable terminal 10, or at least one of the components of the portable terminal 10 described in the above embodiment may be provided in the server 50. Specifically, the portable terminal 10 may include the voiceprint analyzing unit 55 or the text data generating unit 54 of the server 50, for example.

In the above described embodiment, the present invention is mainly used for business purposes. However, the present invention may be used in one's private time, or may be used both business and private purposes.

While the exemplary embodiments of the present invention have been illustrated in detail, the present invention is not limited to the above-mentioned embodiments, and other embodiments, variations and modifications may be made without departing from the scope of the present invention.

The invention claimed is:

1. A portable terminal comprising:
a memory that stores a first schedule;
a display that displays information;
a microphone that collects audio information;
a communicator that transmits audio data based on the collected audio information to an external device, and receives converted data from the external device, the external device converting the transmitted audio data into the converted data;
a controller that controls the display to display information according to the converted data and stores the converted data in the memory when the collected audio information is associated with a second schedule; and
a warning unit that issues a warning when the first schedule and the second schedule overlap.

2. The portable terminal of claim 1, wherein the issuing the warning by the warning unit includes outputting a warning sound.

3. The portable terminal of claim 2, wherein the issuing the warning by the warning unit includes controlling the display to display the warning on the display.

4. The portable terminal of claim 1, wherein the issuing the warning by the warning unit includes controlling the display to display the warning on the display.

5. The portable terminal of claim 1, wherein the controller controls the display to display the first schedule and the second schedule on the display so as to distinguish the first schedule and the second schedule.

6. A portable terminal comprising:
a memory that stores a first schedule;
a display that displays information;
a microphone that collects audio information;
a communicator that transmits audio data based on the collected audio information to an external device, and receives converted data from the external device, the external device converting the transmitted audio data into the converted data; and
a controller that controls the display to display information according to the converted data and stores the converted data in the memory when the collected audio information is associated with a second schedule, wherein the controller erases the first schedule from the memory based on the audio information collected by the microphone.

7. A portable terminal comprising:
a memory that stores a first schedule;
a display that displays information;
a microphone that collects audio information;
a communicator that transmits audio data based on the collected audio information to an external device, and receives converted data from the external device, the external device converting the transmitted audio data into the converted data;
a controller that controls the display to display information according to the converted data and stores the converted data in the memory when the collected audio information is associated with a second schedule; and
a position detector that detects positional information, wherein the controller erases the first schedule from the memory based on the positional information detected by the position detector.

8. A portable terminal comprising:
a memory that stores a first schedule;
a display that displays information;
a microphone that collects audio information;
a communicator that transmits audio data based on the collected audio information to an external device, and receives converted data from the external device, the external device converting the transmitted audio data into the converted data;
a controller that controls the display to display information according to the converted data and stores the converted data in the memory when the collected audio information is associated with a second schedule;
a place detector that detects place information; and
a warning unit that issues a warning when a current place detected by the place detector does not match a place where the first schedule is performed.

9. A portable terminal comprising:
a memory that stores a first schedule;
a display that displays information;
a microphone that collects audio information;
a communicator that transmits audio data based on the collected audio information to an external device, and receives converted data from the external device, the external device converting the transmitted audio data into the converted data;

a controller that controls the display to display information according to the converted data and stores the converted data in the memory when the collected audio information is associated with a second schedule;

a time detector that detects a time; and a warning unit that issues a warning for the first schedule within a predetermined period of time after the detected time.

10. A portable terminal comprising:

a memory that stores a first schedule;

a display that displays information;

a microphone that collects audio information;

a generator that generates data based on the collected audio information;

a controller that controls the display to display information according to the generated data and stores the generated data in the memory when the collected audio information is associated with a second schedule; and a warning unit that issues a warning when the first schedule and the second schedule overlap.

11. The portable terminal of claim 10, wherein the issuing the warning by the warning unit includes outputting a warning sound.

12. The portable terminal of claim 10, wherein the issuing the warning by the warning unit includes controlling the display to display the warning on the display.

13. The portable terminal of claim 10, wherein the controller controls the display to display the first schedule and the second schedule on the display so as to distinguish the first schedule and the second schedule.

14. A portable terminal comprising:

a memory that stores a first schedule;

a display that displays information;

a microphone that collects audio information;

a generator that generates data based on the collected audio information;

a controller that controls the display to display information according to the generated data and stores the generated data in the memory when the collected audio information is associated with a second schedule;

a time detector that detects time information; and a warning unit that issues a warning for the first schedule within a predetermined period of time after the detected time.

* * * * *